United States Patent
Xu et al.

(10) Patent No.: US 12,458,357 B2
(45) Date of Patent: Nov. 4, 2025

(54) RETRACTABLE TROCAR FOR CIRCULAR STAPLING INSTRUMENTS

(71) Applicant: Covidien LP, Mansfield, MA (US)

(72) Inventors: Yishuai Xu, Shanghai (CN); Li Xiang, Shanghai (CN)

(73) Assignee: Covidien LP, Mansfield, MA (US)

( * ) Notice: Subject to any disclaimer, the term of this patent is extended or adjusted under 35 U.S.C. 154(b) by 154 days.

(21) Appl. No.: 18/563,166

(22) PCT Filed: Jun. 9, 2021

(86) PCT No.: PCT/CN2021/099102
§ 371 (c)(1),
(2) Date: Nov. 21, 2023

(87) PCT Pub. No.: WO2022/257040
PCT Pub. Date: Dec. 15, 2022

(65) Prior Publication Data
US 2024/0225652 A1 Jul. 11, 2024

(51) Int. Cl.
*A61B 17/115* (2006.01)
*A61B 17/34* (2006.01)
*A61B 17/11* (2006.01)

(52) U.S. Cl.
CPC ...... *A61B 17/1155* (2013.01); *A61B 17/3417* (2013.01); *A61B 2017/1132* (2013.01)

(58) Field of Classification Search
CPC .......... A61B 17/1155; A61B 17/3417
See application file for complete search history.

(56) References Cited

U.S. PATENT DOCUMENTS

| | | | |
|---|---|---|---|
| 3,388,847 A | 6/1968 | Kasulin et al. |
| 3,552,626 A | 1/1971 | Astafiev et al. |
| 3,638,652 A | 2/1972 | Kelley |
| 3,771,526 A | 11/1973 | Rudie |
| 4,198,982 A | 4/1980 | Fortner et al. |
| 4,207,898 A | 6/1980 | Becht |
| 4,289,133 A | 9/1981 | Rothfuss |
| 4,304,236 A | 12/1981 | Conta et al. |
| 4,319,576 A | 3/1982 | Rothfuss |
| 4,350,160 A | 9/1982 | Kolesov et al. |

(Continued)

FOREIGN PATENT DOCUMENTS

| | | |
|---|---|---|
| CA | 908529 A | 8/1972 |
| CA | 2805365 A1 | 8/2013 |

(Continued)

OTHER PUBLICATIONS

Supplementary European Search Report for EP Application No. 21 94 4550 mailed Dec. 4, 2024 (12 pages).

(Continued)

*Primary Examiner* — Nathaniel C Chukwurah (57) ABSTRACT

A trocar member for a circular stapling instrument includes a tubular housing and a tip member moveable relative to the tubular housing between an extended position and a retracted position. The tubular housing includes proximal and distal portions and defines a longitudinal passage. The tubular housing includes a flange configured for operable engagement with an anvil assembly. The tip member is disposed entirely within the tubular housing when in the retracted position.

20 Claims, 10 Drawing Sheets

(56) References Cited

U.S. PATENT DOCUMENTS

| | | |
|---|---|---|
| 4,351,466 A | 9/1982 | Noiles |
| 4,379,457 A | 4/1983 | Gravener et al. |
| 4,473,077 A | 9/1984 | Noiles et al. |
| 4,476,863 A | 10/1984 | Kanshin et al. |
| 4,485,817 A | 12/1984 | Swiggett |
| 4,488,523 A | 12/1984 | Shichman |
| 4,505,272 A | 3/1985 | Utyamyshev et al. |
| 4,505,414 A | 3/1985 | Filipi |
| 4,520,817 A | 6/1985 | Green |
| 4,550,870 A | 11/1985 | Krumme et al. |
| 4,573,468 A | 3/1986 | Conta et al. |
| 4,576,167 A | 3/1986 | Noiles |
| 4,592,354 A | 6/1986 | Rothfuss |
| 4,603,693 A | 8/1986 | Conta et al. |
| 4,606,343 A | 8/1986 | Conta et al. |
| 4,632,290 A | 12/1986 | Green et al. |
| 4,646,745 A | 3/1987 | Noiles |
| 4,665,917 A | 5/1987 | Clanton et al. |
| 4,667,673 A | 5/1987 | Li |
| 4,671,445 A | 6/1987 | Barker et al. |
| 4,700,703 A | 10/1987 | Resnick et al. |
| 4,703,887 A | 11/1987 | Clanton et al. |
| 4,708,141 A | 11/1987 | Inoue et al. |
| 4,717,063 A | 1/1988 | Ebihara |
| 4,752,024 A | 6/1988 | Green et al. |
| 4,754,909 A | 7/1988 | Barker et al. |
| 4,776,506 A | 10/1988 | Green |
| 4,817,847 A | 4/1989 | Redtenbacher et al. |
| 4,873,977 A | 10/1989 | Avant et al. |
| 4,893,662 A | 1/1990 | Gervasi |
| 4,903,697 A | 2/1990 | Resnick et al. |
| 4,907,591 A | 3/1990 | Vasconcellos et al. |
| 4,917,114 A | 4/1990 | Green et al. |
| 4,957,499 A | 9/1990 | Lipatov et al. |
| 4,962,877 A | 10/1990 | Hervas |
| 5,005,749 A | 4/1991 | Aranyi |
| 5,042,707 A | 8/1991 | Taheri |
| 5,047,039 A | 9/1991 | Avant et al. |
| 5,104,025 A | 4/1992 | Main et al. |
| 5,119,983 A | 6/1992 | Green et al. |
| 5,122,156 A | 6/1992 | Granger et al. |
| 5,139,513 A | 8/1992 | Segato |
| 5,158,222 A | 10/1992 | Green et al. |
| 5,188,638 A | 2/1993 | Tzakis |
| 5,193,731 A | 3/1993 | Aranyi |
| 5,197,648 A | 3/1993 | Gingold |
| 5,197,649 A | 3/1993 | Bessler et al. |
| 5,205,459 A | 4/1993 | Brinkerhoff et al. |
| 5,221,036 A | 6/1993 | Takase |
| 5,222,963 A | 6/1993 | Brinkerhoff et al. |
| 5,253,793 A | 10/1993 | Green et al. |
| 5,261,920 A | 11/1993 | Main et al. |
| 5,271,543 A | 12/1993 | Grant et al. |
| 5,271,544 A | 12/1993 | Fox et al. |
| 5,275,322 A | 1/1994 | Brinkerhoff et al. |
| 5,282,810 A | 2/1994 | Allen et al. |
| 5,285,944 A | 2/1994 | Green et al. |
| 5,285,945 A | 2/1994 | Brinkerhoff et al. |
| 5,292,053 A | 3/1994 | Bilotti et al. |
| 5,309,927 A | 5/1994 | Welch |
| 5,312,024 A | 5/1994 | Grant et al. |
| 5,314,435 A | 5/1994 | Green et al. |
| 5,314,436 A | 5/1994 | Wilk |
| 5,330,486 A | 7/1994 | Wilk |
| 5,333,773 A | 8/1994 | Main et al. |
| 5,344,059 A | 9/1994 | Green et al. |
| 5,346,115 A | 9/1994 | Perouse et al. |
| 5,348,259 A | 9/1994 | Blanco et al. |
| 5,350,104 A | 9/1994 | Main et al. |
| 5,355,897 A | 10/1994 | Pietrafitta et al. |
| 5,360,154 A | 11/1994 | Green |
| 5,368,215 A | 11/1994 | Green et al. |
| 5,392,979 A | 2/1995 | Green et al. |
| 5,395,030 A | 3/1995 | Kuramoto et al. |
| 5,403,333 A | 4/1995 | Kaster et al. |
| 5,404,870 A | 4/1995 | Brinkerhoff et al. |
| 5,411,508 A | 5/1995 | Bessler et al. |
| 5,425,738 A | 6/1995 | Gustafson et al. |
| 5,433,721 A | 7/1995 | Hooven et al. |
| 5,437,684 A | 8/1995 | Calabrese et al. |
| 5,439,156 A | 8/1995 | Grant et al. |
| 5,443,198 A | 8/1995 | Viola et al. |
| 5,447,514 A | 9/1995 | Gerry et al. |
| 5,454,825 A | 10/1995 | Van Leeuwen et al. |
| 5,464,144 A | 11/1995 | Guy et al. |
| 5,464,415 A | 11/1995 | Chen |
| 5,470,006 A | 11/1995 | Rodak |
| 5,474,223 A | 12/1995 | Viola et al. |
| 5,497,934 A | 3/1996 | Brady et al. |
| 5,503,635 A | 4/1996 | Sauer et al. |
| 5,522,534 A | 6/1996 | Viola et al. |
| 5,533,661 A | 7/1996 | Main et al. |
| 5,588,579 A | 12/1996 | Schnut et al. |
| 5,609,285 A | 3/1997 | Grant et al. |
| 5,626,591 A | 5/1997 | Kockerling et al. |
| 5,632,433 A | 5/1997 | Grant et al. |
| 5,639,008 A | 6/1997 | Gallagher et al. |
| 5,641,111 A | 6/1997 | Ahrens et al. |
| 5,658,300 A | 8/1997 | Bito et al. |
| 5,669,918 A | 9/1997 | Balazs et al. |
| 5,685,474 A | 11/1997 | Seeber |
| 5,709,335 A | 1/1998 | Heck |
| 5,715,987 A | 2/1998 | Kelley et al. |
| 5,718,360 A | 2/1998 | Green et al. |
| 5,720,755 A | 2/1998 | Dakov |
| 5,732,872 A | 3/1998 | Bolduc et al. |
| 5,749,896 A | 5/1998 | Cook |
| 5,758,814 A | 6/1998 | Gallagher et al. |
| 5,799,857 A | 9/1998 | Robertson et al. |
| 5,814,055 A | 9/1998 | Knodel et al. |
| 5,833,698 A | 11/1998 | Hinchliffe et al. |
| 5,836,503 A | 11/1998 | Ehrenfels et al. |
| 5,839,639 A | 11/1998 | Sauer et al. |
| 5,855,312 A | 1/1999 | Toledano |
| 5,860,581 A | 1/1999 | Robertson et al. |
| 5,868,760 A | 2/1999 | McGuckin, Jr. |
| 5,881,943 A | 3/1999 | Heck et al. |
| 5,915,616 A | 6/1999 | Viola et al. |
| 5,947,363 A | 9/1999 | Bolduc et al. |
| 5,951,576 A | 9/1999 | Wakabayashi |
| 5,957,363 A | 9/1999 | Heck |
| 5,993,468 A | 11/1999 | Rygaard |
| 6,024,748 A | 2/2000 | Manzo et al. |
| 6,050,472 A | 4/2000 | Shibata |
| 6,053,390 A | 4/2000 | Green et al. |
| 6,068,636 A | 5/2000 | Chen |
| 6,083,241 A | 7/2000 | Longo et al. |
| 6,102,271 A | 8/2000 | Longo et al. |
| 6,117,148 A | 9/2000 | Ravo et al. |
| 6,119,913 A | 9/2000 | Adams et al. |
| 6,126,058 A | 10/2000 | Adams et al. |
| 6,142,933 A | 11/2000 | Longo et al. |
| 6,149,667 A | 11/2000 | Hovland et al. |
| 6,176,413 B1 | 1/2001 | Heck et al. |
| 6,179,195 B1 | 1/2001 | Adams et al. |
| 6,193,129 B1 | 2/2001 | Bittner et al. |
| 6,203,553 B1 | 3/2001 | Robertson et al. |
| 6,209,773 B1 | 4/2001 | Bolduc et al. |
| 6,241,140 B1 | 6/2001 | Adams et al. |
| 6,253,984 B1 | 7/2001 | Heck et al. |
| 6,258,107 B1 | 7/2001 | Balazs et al. |
| 6,264,086 B1 | 7/2001 | McGuckin, Jr. |
| 6,269,997 B1 | 8/2001 | Balazs et al. |
| 6,273,897 B1 | 8/2001 | Dalessandro et al. |
| 6,279,809 B1 | 8/2001 | Nicolo |
| 6,302,311 B1 | 10/2001 | Adams et al. |
| 6,338,737 B1 | 1/2002 | Toledano |
| 6,343,731 B1 | 2/2002 | Adams et al. |
| 6,387,105 B1 | 5/2002 | Gifford, III et al. |
| 6,398,795 B1 | 6/2002 | McAlister et al. |
| 6,402,008 B1 | 6/2002 | Lucas |
| 6,439,446 B1 | 8/2002 | Perry et al. |
| 6,443,973 B1 | 9/2002 | Whitman |
| 6,450,390 B2 | 9/2002 | Heck et al. |

(56) References Cited

U.S. PATENT DOCUMENTS

| | | |
|---|---|---|
| 6,478,210 B2 | 11/2002 | Adams et al. |
| 6,488,197 B1 | 12/2002 | Whitman |
| 6,491,201 B1 | 12/2002 | Whitman |
| 6,494,877 B2 | 12/2002 | Odell et al. |
| 6,503,259 B2 | 1/2003 | Huxel et al. |
| 6,517,566 B1 | 2/2003 | Hovland et al. |
| 6,520,398 B2 | 2/2003 | Nicolo |
| 6,533,157 B1 | 3/2003 | Whitman |
| 6,551,334 B2 | 4/2003 | Blatter et al. |
| 6,578,751 B2 | 6/2003 | Hartwick |
| 6,585,144 B2 | 7/2003 | Adams et al. |
| 6,588,643 B2 | 7/2003 | Bolduc et al. |
| 6,592,596 B1 | 7/2003 | Geitz |
| 6,601,749 B2 | 8/2003 | Sullivan et al. |
| 6,605,078 B2 | 8/2003 | Adams |
| 6,605,098 B2 | 8/2003 | Nobis et al. |
| 6,626,921 B2 | 9/2003 | Blatter et al. |
| 6,629,630 B2 | 10/2003 | Adams |
| 6,631,837 B1 | 10/2003 | Heck |
| 6,632,227 B2 | 10/2003 | Adams |
| 6,632,237 B2 | 10/2003 | Ben-David et al. |
| 6,652,542 B2 | 11/2003 | Blatter et al. |
| 6,659,327 B2 | 12/2003 | Heck et al. |
| 6,676,671 B2 | 1/2004 | Robertson et al. |
| 6,681,979 B2 | 1/2004 | Whitman |
| 6,685,079 B2 | 2/2004 | Sharma et al. |
| 6,695,198 B2 | 2/2004 | Adams et al. |
| 6,695,199 B2 | 2/2004 | Whitman |
| 6,698,643 B2 | 3/2004 | Whitman |
| 6,716,222 B2 | 4/2004 | McAlister et al. |
| 6,716,233 B1 | 4/2004 | Whitman |
| 6,726,697 B2 | 4/2004 | Nicholas et al. |
| 6,742,692 B2 | 6/2004 | Hartwick |
| 6,743,244 B2 | 6/2004 | Blatter et al. |
| 6,763,993 B2 | 7/2004 | Bolduc et al. |
| 6,769,590 B2 | 8/2004 | Vresh et al. |
| 6,769,594 B2 | 8/2004 | Orban, III |
| 6,820,791 B2 | 11/2004 | Adams |
| 6,821,282 B2 | 11/2004 | Perry et al. |
| 6,827,246 B2 | 12/2004 | Sullivan et al. |
| 6,840,423 B2 | 1/2005 | Adams et al. |
| 6,843,403 B2 | 1/2005 | Whitman |
| 6,846,308 B2 | 1/2005 | Whitman et al. |
| 6,852,122 B2 | 2/2005 | Rush |
| 6,866,178 B2 | 3/2005 | Adams et al. |
| 6,872,214 B2 | 3/2005 | Sonnenschein et al. |
| 6,874,669 B2 | 4/2005 | Adams et al. |
| 6,884,250 B2 | 4/2005 | Monassevitch et al. |
| 6,905,504 B1 | 6/2005 | Vargas |
| 6,938,814 B2 | 9/2005 | Sharma et al. |
| 6,942,675 B1 | 9/2005 | Vargas |
| 6,945,444 B2 * | 9/2005 | Gresham .............. A61B 17/115 227/181.1 |
| 6,953,138 B1 | 10/2005 | Dworak et al. |
| 6,957,758 B2 | 10/2005 | Aranyi |
| 6,959,851 B2 | 11/2005 | Heinrich |
| 6,978,922 B2 | 12/2005 | Bilotti et al. |
| 6,981,941 B2 | 1/2006 | Whitman et al. |
| 6,981,979 B2 | 1/2006 | Nicolo |
| 7,032,798 B2 | 4/2006 | Whitman et al. |
| 7,059,331 B2 | 6/2006 | Adams et al. |
| 7,059,510 B2 | 6/2006 | Orban, III |
| 7,077,856 B2 | 7/2006 | Whitman |
| 7,080,769 B2 | 7/2006 | Vresh et al. |
| 7,086,267 B2 | 8/2006 | Dworak et al. |
| 7,114,642 B2 | 10/2006 | Whitman |
| 7,118,528 B1 | 10/2006 | Piskun |
| 7,122,044 B2 | 10/2006 | Bolduc et al. |
| 7,128,748 B2 | 10/2006 | Mooradian et al. |
| 7,141,055 B2 | 11/2006 | Abrams et al. |
| 7,168,604 B2 | 1/2007 | Milliman et al. |
| 7,179,267 B2 | 2/2007 | Nolan et al. |
| 7,182,239 B1 | 2/2007 | Myers |
| 7,195,142 B2 | 3/2007 | Orban, III |
| 7,207,168 B2 | 4/2007 | Doepker et al. |
| 7,220,237 B2 | 5/2007 | Gannoe et al. |
| 7,234,624 B2 | 6/2007 | Gresham et al. |
| 7,235,089 B1 | 6/2007 | McGuckin, Jr. |
| RE39,841 E | 9/2007 | Bilotti et al. |
| 7,285,125 B2 | 10/2007 | Viola |
| 7,303,106 B2 | 12/2007 | Milliman et al. |
| 7,303,107 B2 | 12/2007 | Milliman et al. |
| 7,309,341 B2 | 12/2007 | Ortiz et al. |
| 7,322,994 B2 | 1/2008 | Nicholas et al. |
| 7,325,713 B2 | 2/2008 | Aranyi |
| 7,334,718 B2 | 2/2008 | McAlister et al. |
| 7,335,212 B2 | 2/2008 | Edoga et al. |
| 7,364,060 B2 | 4/2008 | Milliman |
| 7,398,908 B2 | 7/2008 | Holsten et al. |
| 7,399,305 B2 | 7/2008 | Csiky et al. |
| 7,401,721 B2 | 7/2008 | Holsten et al. |
| 7,401,722 B2 | 7/2008 | Hur |
| 7,407,075 B2 | 8/2008 | Holsten et al. |
| 7,410,086 B2 | 8/2008 | Ortiz et al. |
| 7,422,137 B2 | 9/2008 | Manzo |
| 7,422,138 B2 | 9/2008 | Bilotti et al. |
| 7,431,191 B2 | 10/2008 | Milliman |
| 7,438,718 B2 | 10/2008 | Milliman et al. |
| 7,455,676 B2 | 11/2008 | Holsten et al. |
| 7,455,682 B2 | 11/2008 | Viola |
| 7,481,347 B2 | 1/2009 | Roy |
| 7,494,038 B2 | 2/2009 | Milliman |
| 7,506,791 B2 | 3/2009 | Omaits et al. |
| 7,516,877 B2 | 4/2009 | Aranyi |
| 7,527,185 B2 | 5/2009 | Harari et al. |
| 7,537,602 B2 | 5/2009 | Whitman |
| 7,540,839 B2 | 6/2009 | Butler et al. |
| 7,546,939 B2 | 6/2009 | Adams et al. |
| 7,546,940 B2 | 6/2009 | Milliman et al. |
| 7,547,312 B2 | 6/2009 | Bauman et al. |
| 7,556,186 B2 | 7/2009 | Milliman |
| 7,559,451 B2 | 7/2009 | Sharma et al. |
| 7,585,306 B2 | 9/2009 | Abbott et al. |
| 7,588,174 B2 | 9/2009 | Holsten et al. |
| 7,600,663 B2 | 10/2009 | Green |
| 7,611,038 B2 | 11/2009 | Racenet et al. |
| 7,635,385 B2 | 12/2009 | Milliman et al. |
| 7,669,747 B2 | 3/2010 | Weisenburgh, II et al. |
| 7,686,201 B2 | 3/2010 | Csiky |
| 7,694,864 B2 | 4/2010 | Okada et al. |
| 7,699,204 B2 | 4/2010 | Viola |
| 7,708,181 B2 | 5/2010 | Cole et al. |
| 7,717,313 B2 | 5/2010 | Criscuolo et al. |
| 7,721,932 B2 | 5/2010 | Cole et al. |
| 7,726,539 B2 | 6/2010 | Holsten et al. |
| 7,743,958 B2 | 6/2010 | Orban, III |
| 7,744,627 B2 | 6/2010 | Orban, III et al. |
| 7,770,776 B2 | 8/2010 | Chen et al. |
| 7,771,440 B2 | 8/2010 | Ortiz et al. |
| 7,776,060 B2 | 8/2010 | Mooradian et al. |
| 7,793,813 B2 | 9/2010 | Bettuchi |
| 7,802,712 B2 | 9/2010 | Milliman et al. |
| 7,823,592 B2 | 11/2010 | Bettuchi et al. |
| 7,837,079 B2 | 11/2010 | Holsten et al. |
| 7,837,080 B2 | 11/2010 | Schwemberger |
| 7,837,081 B2 | 11/2010 | Holsten et al. |
| 7,845,536 B2 | 12/2010 | Viola et al. |
| 7,845,538 B2 | 12/2010 | Whitman |
| 7,857,187 B2 | 12/2010 | Milliman |
| 7,886,951 B2 | 2/2011 | Hessler |
| 7,896,215 B2 | 3/2011 | Adams et al. |
| 7,900,806 B2 | 3/2011 | Chen et al. |
| 7,909,039 B2 | 3/2011 | Hur |
| 7,909,219 B2 | 3/2011 | Cole et al. |
| 7,909,222 B2 | 3/2011 | Cole et al. |
| 7,909,223 B2 | 3/2011 | Cole et al. |
| 7,913,892 B2 | 3/2011 | Cole et al. |
| 7,918,377 B2 | 4/2011 | Measamer et al. |
| 7,922,062 B2 | 4/2011 | Cole et al. |
| 7,922,743 B2 | 4/2011 | Heinrich et al. |
| 7,931,183 B2 | 4/2011 | Orban, III |
| 7,938,307 B2 | 5/2011 | Bettuchi |
| 7,942,302 B2 | 5/2011 | Roby et al. |
| 7,951,166 B2 | 5/2011 | Orban, III et al. |

(56) References Cited

U.S. PATENT DOCUMENTS

| | | |
|---|---|---|
| 7,959,050 B2 | 6/2011 | Smith et al. |
| 7,967,181 B2 | 6/2011 | Viola et al. |
| 7,975,895 B2 | 7/2011 | Milliman |
| 8,002,795 B2 | 8/2011 | Beetel |
| 8,006,701 B2 | 8/2011 | Bilotti et al. |
| 8,006,889 B2 | 8/2011 | Adams et al. |
| 8,011,551 B2 | 9/2011 | Marczyk et al. |
| 8,011,554 B2 | 9/2011 | Milliman |
| 8,016,177 B2 | 9/2011 | Bettuchi et al. |
| 8,016,858 B2 | 9/2011 | Whitman |
| 8,020,741 B2 | 9/2011 | Cole et al. |
| 8,025,199 B2 | 9/2011 | Whitman et al. |
| 8,028,885 B2 | 10/2011 | Smith et al. |
| 8,038,046 B2 | 10/2011 | Smith et al. |
| 8,043,207 B2 | 10/2011 | Adams |
| 8,066,167 B2 | 11/2011 | Measamer et al. |
| 8,066,169 B2 | 11/2011 | Viola |
| 8,070,035 B2 | 12/2011 | Holsten et al. |
| 8,070,037 B2 | 12/2011 | Csiky |
| 8,096,458 B2 | 1/2012 | Hessler |
| 8,109,426 B2 | 2/2012 | Milliman et al. |
| 8,109,427 B2 | 2/2012 | Orban, III |
| 8,113,405 B2 | 2/2012 | Milliman |
| 8,113,406 B2 | 2/2012 | Holsten et al. |
| 8,113,407 B2 | 2/2012 | Holsten et al. |
| 8,123,103 B2 | 2/2012 | Milliman |
| 8,128,645 B2 | 3/2012 | Sonnenschein et al. |
| 8,132,703 B2 | 3/2012 | Milliman et al. |
| 8,136,712 B2 | 3/2012 | Zingman |
| 8,146,790 B2 | 4/2012 | Milliman |
| 8,146,791 B2 | 4/2012 | Bettuchi et al. |
| 8,181,838 B2 | 5/2012 | Milliman et al. |
| 8,192,460 B2 | 6/2012 | Orban, III et al. |
| 8,201,720 B2 | 6/2012 | Hessler |
| 8,203,782 B2 | 6/2012 | Brueck et al. |
| 8,211,130 B2 | 7/2012 | Viola |
| 8,225,799 B2 | 7/2012 | Bettuchi |
| 8,225,981 B2 | 7/2012 | Criscuolo et al. |
| 8,231,041 B2 | 7/2012 | Marczyk et al. |
| 8,231,042 B2 | 7/2012 | Hessler et al. |
| 8,257,391 B2 | 9/2012 | Orban, III et al. |
| 8,267,301 B2 | 9/2012 | Milliman et al. |
| 8,272,552 B2 | 9/2012 | Holsten et al. |
| 8,276,802 B2 | 10/2012 | Kostrzewski |
| 8,281,975 B2 | 10/2012 | Criscuolo et al. |
| 8,286,845 B2 | 10/2012 | Perry et al. |
| 8,308,045 B2 | 11/2012 | Bettuchi et al. |
| 8,312,885 B2 | 11/2012 | Bettuchi et al. |
| 8,313,014 B2 | 11/2012 | Bettuchi |
| 8,317,073 B2 | 11/2012 | Milliman et al. |
| 8,317,074 B2 | 11/2012 | Ortiz et al. |
| 8,322,590 B2 | 12/2012 | Patel et al. |
| 8,328,060 B2 | 12/2012 | Jankowski et al. |
| 8,328,062 B2 | 12/2012 | Viola |
| 8,328,063 B2 | 12/2012 | Milliman et al. |
| 8,343,185 B2 | 1/2013 | Milliman et al. |
| 8,353,438 B2 | 1/2013 | Baxter et al. |
| 8,353,439 B2 | 1/2013 | Baxter et al. |
| 8,353,930 B2 | 1/2013 | Heinrich et al. |
| 8,360,295 B2 | 1/2013 | Milliman et al. |
| 8,365,974 B2 | 2/2013 | Milliman |
| 8,403,942 B2 | 3/2013 | Milliman et al. |
| 8,408,441 B2 | 4/2013 | Wenchell et al. |
| 8,413,870 B2 | 4/2013 | Pastorelli et al. |
| 8,413,872 B2 | 4/2013 | Patel |
| 8,418,905 B2 | 4/2013 | Milliman |
| 8,418,909 B2 | 4/2013 | Kostrzewski |
| 8,424,535 B2 | 4/2013 | Hessler et al. |
| 8,424,741 B2 | 4/2013 | McGuckin, Jr. et al. |
| 8,430,291 B2 | 4/2013 | Heinrich et al. |
| 8,430,292 B2 | 4/2013 | Patel et al. |
| 8,453,910 B2 | 6/2013 | Bettuchi et al. |
| 8,453,911 B2 | 6/2013 | Milliman et al. |
| 8,479,968 B2 | 7/2013 | Hodgkinson et al. |
| 8,485,414 B2 | 7/2013 | Criscuolo et al. |
| 8,490,853 B2 | 7/2013 | Criscuolo et al. |
| 8,511,533 B2 | 8/2013 | Viola et al. |
| 8,551,138 B2 | 10/2013 | Orban, III et al. |
| 8,567,655 B2 | 10/2013 | Nalagatla et al. |
| 8,579,178 B2 | 11/2013 | Holsten et al. |
| 8,590,763 B2 | 11/2013 | Milliman |
| 8,590,764 B2 | 11/2013 | Hartwick et al. |
| 8,608,047 B2 | 12/2013 | Holsten et al. |
| 8,616,428 B2 | 12/2013 | Milliman et al. |
| 8,616,429 B2 | 12/2013 | Viola |
| 8,622,275 B2 | 1/2014 | Baxter, III et al. |
| 8,627,995 B2 | 1/2014 | Smith et al. |
| 8,631,993 B2 | 1/2014 | Kostrzewski |
| 8,636,187 B2 | 1/2014 | Hueil et al. |
| 8,640,940 B2 | 2/2014 | Ohdaira |
| 8,646,674 B2 | 2/2014 | Schulte et al. |
| 8,662,370 B2 | 3/2014 | Takei |
| 8,663,258 B2 | 3/2014 | Bettuchi et al. |
| 8,672,207 B2 | 3/2014 | Shelton, IV et al. |
| 8,672,931 B2 | 3/2014 | Goldboss et al. |
| 8,672,951 B2 | 3/2014 | Smith et al. |
| 8,678,264 B2 | 3/2014 | Racenet et al. |
| 8,679,137 B2 | 3/2014 | Bauman et al. |
| 8,684,248 B2 | 4/2014 | Milliman |
| 8,684,250 B2 | 4/2014 | Bettuchi et al. |
| 8,684,251 B2 | 4/2014 | Rebuffat et al. |
| 8,684,252 B2 | 4/2014 | Patel et al. |
| 8,695,864 B1 | 4/2014 | Hausen |
| 8,708,212 B2 | 4/2014 | Williams |
| 8,733,611 B2 | 5/2014 | Milliman |
| 8,733,615 B2 | 5/2014 | Nalagatla et al. |
| 8,746,531 B2 | 6/2014 | Wenchell et al. |
| 8,746,532 B2 | 6/2014 | Nalagatla et al. |
| 8,783,543 B2 | 7/2014 | Shelton, IV et al. |
| 8,789,737 B2 | 7/2014 | Hodgkinson et al. |
| 8,800,838 B2 | 8/2014 | Shelton, IV |
| 8,800,841 B2 | 8/2014 | Ellerhorst et al. |
| 8,801,734 B2 | 8/2014 | Shelton, IV et al. |
| 8,801,735 B2 | 8/2014 | Shelton, IV et al. |
| 8,821,523 B2 | 9/2014 | Heinrich et al. |
| 8,827,903 B2 | 9/2014 | Shelton, IV et al. |
| 8,833,629 B2 | 9/2014 | Nalagatla et al. |
| 8,840,004 B2 | 9/2014 | Holsten et al. |
| 8,844,792 B2 | 9/2014 | Viola |
| 8,845,661 B2 | 9/2014 | D'Arcangelo et al. |
| 8,870,911 B2 | 10/2014 | Williams et al. |
| 8,875,974 B2 | 11/2014 | Rebuffat et al. |
| 8,893,948 B2 | 11/2014 | Williams |
| 8,910,847 B2 | 12/2014 | Nalagatla et al. |
| 8,925,785 B2 | 1/2015 | Holsten et al. |
| 8,925,786 B2 | 1/2015 | Holsten et al. |
| 8,967,448 B2 | 3/2015 | Carter et al. |
| 8,978,955 B2 | 3/2015 | Aronhalt et al. |
| 9,010,608 B2 | 4/2015 | Casasanta, Jr. et al. |
| 9,010,612 B2 | 4/2015 | Stevenson et al. |
| 9,016,540 B2 | 4/2015 | Whitman et al. |
| 9,033,204 B2 | 5/2015 | Shelton, IV et al. |
| 9,055,943 B2 | 6/2015 | Zemlok et al. |
| 9,095,340 B2 | 8/2015 | Felder et al. |
| 9,113,871 B2 | 8/2015 | Milliman et al. |
| 9,113,877 B1 | 8/2015 | Whitman et al. |
| 9,113,883 B2 | 8/2015 | Aronhalt et al. |
| 9,113,884 B2 | 8/2015 | Shelton, IV et al. |
| 9,113,885 B2 | 8/2015 | Hodgkinson et al. |
| 9,125,654 B2 | 9/2015 | Aronhalt et al. |
| 9,155,536 B1 | 10/2015 | Hausen et al. |
| 9,161,757 B2 | 10/2015 | Bettuchi |
| 9,204,881 B2 | 12/2015 | Penna |
| 9,211,122 B2 | 12/2015 | Hagerty et al. |
| 9,220,504 B2 | 12/2015 | Viola et al. |
| 9,232,941 B2 | 1/2016 | Mandakolathur Vasudevan et al. |
| 9,232,945 B2 | 1/2016 | Zingman |
| 9,289,207 B2 | 3/2016 | Shelton, IV |
| 9,301,763 B2 | 4/2016 | Qiao et al. |
| 9,307,994 B2 * | 4/2016 | Gresham ............ A61B 17/115 |
| 9,326,773 B2 | 5/2016 | Casasanta, Jr. et al. |
| 9,351,729 B2 | 5/2016 | Orban, III et al. |
| 9,351,731 B2 | 5/2016 | Carter et al. |
| 9,364,229 B2 | 6/2016 | D'Agostino et al. |

(56) References Cited

U.S. PATENT DOCUMENTS

| | | |
|---|---|---|
| 9,370,366 B2 | 6/2016 | Mozdzierz |
| 9,370,367 B2 | 6/2016 | Mozdzierz |
| 9,393,014 B2 | 7/2016 | Milliman |
| 9,408,603 B2 | 8/2016 | Patel |
| 9,421,013 B2 | 8/2016 | Patel et al. |
| 9,445,817 B2 | 9/2016 | Bettuchi |
| 9,451,962 B2 | 9/2016 | Olson |
| 9,456,821 B2 | 10/2016 | Bettuchi et al. |
| 9,463,022 B2 | 10/2016 | Swayze et al. |
| 9,492,166 B2 | 11/2016 | Kostrzewski |
| 9,498,222 B2 | 11/2016 | Scheib et al. |
| 9,504,470 B2 | 11/2016 | Milliman |
| 9,522,005 B2 | 12/2016 | Williams et al. |
| 9,549,738 B2 | 1/2017 | Mandakolathur Vasudevan et al. |
| 9,572,572 B2 | 2/2017 | Williams |
| 9,579,102 B2 | 2/2017 | Holsten et al. |
| 9,592,055 B2 | 3/2017 | Milliman et al. |
| 9,592,056 B2 | 3/2017 | Mozdzierz et al. |
| 9,597,081 B2 | 3/2017 | Swayze et al. |
| 9,597,082 B2 | 3/2017 | Stokes et al. |
| 9,603,599 B2 | 3/2017 | Miller et al. |
| 9,629,624 B2 | 4/2017 | Hessler et al. |
| 9,636,112 B2 | 5/2017 | Penna et al. |
| 9,649,110 B2 | 5/2017 | Parihar et al. |
| 9,649,113 B2 | 5/2017 | Ma et al. |
| 9,668,740 B2 | 6/2017 | Williams |
| 9,675,348 B2 | 6/2017 | Smith et al. |
| 9,681,872 B2 | 6/2017 | Jankowski et al. |
| 9,681,873 B2 | 6/2017 | Smith et al. |
| 9,687,234 B2 | 6/2017 | Smith et al. |
| 9,693,773 B2 | 7/2017 | Williams |
| 9,700,309 B2 | 7/2017 | Jaworek |
| 9,706,999 B2 | 7/2017 | Motai |
| 9,713,469 B2 | 7/2017 | Leimbach et al. |
| 9,737,304 B2 | 8/2017 | Bettuchi et al. |
| 9,743,955 B2 | 8/2017 | Hill et al. |
| 9,750,503 B2 | 9/2017 | Milliman |
| 9,763,663 B2 | 9/2017 | Weisshaupt et al. |
| 9,801,626 B2 | 10/2017 | Parihar et al. |
| 9,833,235 B2 | 12/2017 | Penna et al. |
| 9,844,368 B2 | 12/2017 | Boudreaux et al. |
| 9,861,368 B2 | 1/2018 | Racenet et al. |
| 9,883,862 B2 | 2/2018 | Rebuffat et al. |
| 9,907,600 B2 | 3/2018 | Stulen et al. |
| 9,918,713 B2 | 3/2018 | Zergiebel et al. |
| 10,039,549 B2 | 8/2018 | Williams |
| 10,085,744 B2 | 10/2018 | Williams et al. |
| 10,105,137 B2 | 10/2018 | Holsten et al. |
| 10,117,655 B2 | 11/2018 | Scirica et al. |
| 10,117,656 B2 | 11/2018 | Sgroi, Jr. |
| 10,136,888 B2 | 11/2018 | Chen et al. |
| 10,149,680 B2 | 12/2018 | Parihar et al. |
| 10,154,845 B2 | 12/2018 | Williams |
| 10,172,622 B2 | 1/2019 | Kelley |
| 10,178,994 B2 | 1/2019 | Lee et al. |
| 10,188,386 B2 | 1/2019 | Measamer et al. |
| 10,190,888 B2 | 1/2019 | Hryb et al. |
| 10,194,911 B2 | 2/2019 | Miller et al. |
| 10,226,253 B2 | 3/2019 | DiNardo et al. |
| 10,245,038 B2 | 4/2019 | Hopkins et al. |
| 10,271,842 B2 | 4/2019 | Fox et al. |
| 10,271,843 B2 | 4/2019 | Shi et al. |
| 10,307,157 B2 | 6/2019 | Miller et al. |
| 10,321,908 B2 | 6/2019 | Carter et al. |
| 10,327,779 B2 | 6/2019 | Richard et al. |
| 10,342,629 B2 | 7/2019 | Penna et al. |
| 10,405,855 B2 | 9/2019 | Stager et al. |
| 10,413,299 B2 | 9/2019 | Milliman |
| 10,426,468 B2 | 10/2019 | Contini et al. |
| 10,426,480 B2 | 10/2019 | Scirica et al. |
| 10,433,848 B2 | 10/2019 | Chen et al. |
| 10,456,134 B2 | 10/2019 | DiNardo et al. |
| 10,463,365 B2 | 11/2019 | Williams |
| 10,463,373 B2 | 11/2019 | Mozdzierz et al. |
| 10,463,374 B2 | 11/2019 | Sgroi, Jr. |
| 10,470,770 B2 | 11/2019 | Shelton, IV et al. |
| 10,470,771 B2 | 11/2019 | D'Agostino et al. |
| 10,499,922 B2 | 12/2019 | Sgroi, Jr. |
| 10,506,920 B2 | 12/2019 | Hasser et al. |
| 10,507,039 B2 | 12/2019 | Williams |
| 10,512,467 B2 | 12/2019 | Swayze et al. |
| 10,524,795 B2 | 1/2020 | Nalagatla et al. |
| 10,524,798 B2 | 1/2020 | Williams |
| 10,524,868 B2 | 1/2020 | Cooper et al. |
| 10,537,331 B2 | 1/2020 | Scirica et al. |
| 10,542,993 B2 | 1/2020 | Guerrera et al. |
| 10,548,598 B2 | 2/2020 | Prescott et al. |
| 10,561,424 B2 | 2/2020 | Penna et al. |
| 10,568,631 B2 | 2/2020 | Rebuffat et al. |
| 10,575,847 B2 | 3/2020 | Hessler et al. |
| 10,595,871 B2 | 3/2020 | Racenet et al. |
| 10,595,872 B2 | 3/2020 | Milliman |
| 10,603,042 B2 | 3/2020 | Sgroi |
| 10,624,646 B2 | 4/2020 | Bae et al. |
| 10,639,041 B2 | 5/2020 | Williams |
| 10,653,414 B2 | 5/2020 | Williams |
| 10,898,196 B2 | 1/2021 | Sapienza et al. |
| 2003/0111507 A1 | 6/2003 | Nunez |
| 2005/0023325 A1* | 2/2005 | Gresham ............ A61B 17/115 |
| | | 227/176.1 |
| 2005/0051597 A1 | 3/2005 | Toledano |
| 2005/0107813 A1 | 5/2005 | Gilete Garcia |
| 2006/0000869 A1 | 1/2006 | Fontayne |
| 2006/0011698 A1 | 1/2006 | Okada et al. |
| 2006/0043148 A1* | 3/2006 | Gresham ............ A61B 17/1155 |
| | | 227/176.1 |
| 2006/0201989 A1 | 9/2006 | Ojeda |
| 2007/0027473 A1 | 2/2007 | Vresh et al. |
| 2007/0029363 A1 | 2/2007 | Popov |
| 2007/0060952 A1 | 3/2007 | Roby et al. |
| 2009/0236392 A1 | 9/2009 | Cole et al. |
| 2009/0236398 A1 | 9/2009 | Cole et al. |
| 2009/0236401 A1 | 9/2009 | Cole et al. |
| 2010/0019016 A1 | 1/2010 | Edoga et al. |
| 2010/0051668 A1 | 3/2010 | Milliman et al. |
| 2010/0084453 A1 | 4/2010 | Hu |
| 2010/0163598 A1* | 7/2010 | Belzer ................ A61B 17/1155 |
| | | 227/181.1 |
| 2010/0224668 A1 | 9/2010 | Fontayne et al. |
| 2010/0230465 A1 | 9/2010 | Smith et al. |
| 2011/0011916 A1 | 1/2011 | Levine |
| 2011/0114697 A1 | 5/2011 | Baxter, III et al. |
| 2011/0114700 A1 | 5/2011 | Baxter, III et al. |
| 2011/0144640 A1 | 6/2011 | Heinrich et al. |
| 2011/0192882 A1 | 8/2011 | Hess et al. |
| 2012/0145755 A1 | 6/2012 | Kahn |
| 2012/0193395 A1 | 8/2012 | Pastorelli et al. |
| 2012/0193398 A1 | 8/2012 | Williams et al. |
| 2012/0232339 A1 | 9/2012 | Csiky |
| 2012/0273548 A1 | 11/2012 | Ma et al. |
| 2013/0020372 A1 | 1/2013 | Jankowski et al. |
| 2013/0020373 A1 | 1/2013 | Smith et al. |
| 2013/0032628 A1 | 2/2013 | Li et al. |
| 2013/0060258 A1 | 3/2013 | Giacomantonio |
| 2013/0105544 A1 | 5/2013 | Mozdzierz et al. |
| 2013/0105551 A1 | 5/2013 | Zingman |
| 2013/0126580 A1 | 5/2013 | Smith et al. |
| 2013/0153631 A1 | 6/2013 | Vasudevan et al. |
| 2013/0175315 A1 | 7/2013 | Milliman |
| 2013/0175318 A1 | 7/2013 | Felder et al. |
| 2013/0181035 A1 | 7/2013 | Milliman |
| 2013/0181036 A1 | 7/2013 | Olson et al. |
| 2013/0193190 A1 | 8/2013 | Carter et al. |
| 2013/0200131 A1 | 8/2013 | Racenet et al. |
| 2013/0206816 A1 | 8/2013 | Penna |
| 2013/0240597 A1 | 9/2013 | Milliman et al. |
| 2013/0277411 A1 | 10/2013 | Hodgkinson et al. |
| 2013/0284792 A1 | 10/2013 | Ma |
| 2014/0008413 A1 | 1/2014 | Williams |
| 2014/0046352 A1 | 2/2014 | Reboa et al. |
| 2014/0151429 A1 | 6/2014 | Scheib et al. |
| 2014/0158747 A1 | 6/2014 | Measamer et al. |
| 2014/0284370 A1 | 9/2014 | Sahin |
| 2015/0083772 A1 | 3/2015 | Miller et al. |

(56) References Cited

U.S. PATENT DOCUMENTS

| | | |
|---|---|---|
| 2015/0173763 A1 | 6/2015 | Liu |
| 2015/0209045 A1 | 7/2015 | Hodgkinson et al. |
| 2017/0079569 A1 | 3/2017 | Rasch-Menges et al. |
| 2017/0128068 A1 | 5/2017 | Zhang et al. |
| 2021/0077093 A1 | 3/2021 | Adams et al. |
| 2021/0275179 A1* | 9/2021 | Eisinger ............ A61B 17/1155 |

FOREIGN PATENT DOCUMENTS

| | | |
|---|---|---|
| CN | 104039244 A | 9/2014 |
| CN | 104042288 A | 9/2014 |
| CN | 104367360 A | 2/2015 |
| CN | 105764568 B | 10/2019 |
| CN | 111820975 A | 10/2020 |
| CN | 111820981 A | 10/2020 |
| CN | 111386084 B | 6/2023 |
| DE | 1057729 B | 5/1959 |
| DE | 3301713 A1 | 7/1984 |
| EP | 0152382 A2 | 8/1985 |
| EP | 0173451 A1 | 3/1986 |
| EP | 0190022 A2 | 8/1986 |
| EP | 0282157 A1 | 9/1988 |
| EP | 0503689 A2 | 9/1992 |
| EP | 1354560 A2 | 10/2003 |
| EP | 1671597 A1 | 6/2006 |
| EP | 2138118 A2 | 12/2009 |
| EP | 2168510 A1 | 3/2010 |
| EP | 2238926 A2 | 10/2010 |
| EP | 2524656 A2 | 11/2012 |
| EP | 3023077 A1 | 5/2016 |
| EP | 3412225 A1 | 12/2018 |
| EP | 3549545 A2 | 10/2019 |
| EP | 3593738 A1 | 1/2020 |
| FR | 1136020 A | 5/1957 |
| FR | 1461464 A | 2/1966 |
| FR | 1588250 A | 4/1970 |
| FR | 2443239 A1 | 7/1980 |
| GB | 1185292 A | 3/1970 |
| GB | 2016991 A | 9/1979 |
| GB | 2070499 A | 9/1981 |
| JP | 2004147969 A | 5/2004 |
| JP | 2013138860 A | 7/2013 |
| NL | 7711347 A | 4/1979 |
| SU | 1509052 A1 | 9/1989 |
| WO | 8706448 A1 | 11/1987 |
| WO | 8900406 A1 | 1/1989 |
| WO | 9006085 A1 | 6/1990 |
| WO | 9835614 A1 | 8/1998 |
| WO | 0154594 A1 | 8/2001 |
| WO | 02080781 A2 | 10/2002 |
| WO | 2004032766 A2 | 4/2004 |
| WO | 2004047654 A2 | 6/2004 |
| WO | 2008107918 A1 | 9/2008 |
| WO | 2019130087 A1 | 7/2019 |

OTHER PUBLICATIONS

International Search Report for Application No. PCT/CN2021/099102 dated Mar. 9, 2022.

Written Opinion for Application No. PCT/CN2021/099102 dated Mar. 9, 2022.

* cited by examiner

RETRACTABLE TROCAR FOR CIRCULAR STAPLING INSTRUMENTS

FIELD

The disclosure relates to circular stapling instruments. More particularly, this disclosure relates to circular stapling instruments including a trocar assembly having a retractable trocar for facilitating attachment of an anvil assembly to the circular stapling instrument.

BACKGROUND

Circular stapling instruments are used to perform end to end anastomosis. During a typical end to end anastomosis procedure, an anvil assembly of the circular stapling instrument is secured to a first section of a tubular organ and a loading unit of the circular stapling instrument is secured to a second section of the tubular organ. The anvil assembly is then attached to a trocar member extending from the loading unit. The trocar member includes a piercing tip to facilitate positioning the second section of the tubular organ about the loading unit. Attaching the anvil assembly to the trocar member requires aligning a center rod assembly of the anvil assembly with the trocar member, which, in the narrow confines of the abdominal cavity, may require stretching of tissue and pose a potential risk to the tissue.

Figure 1:
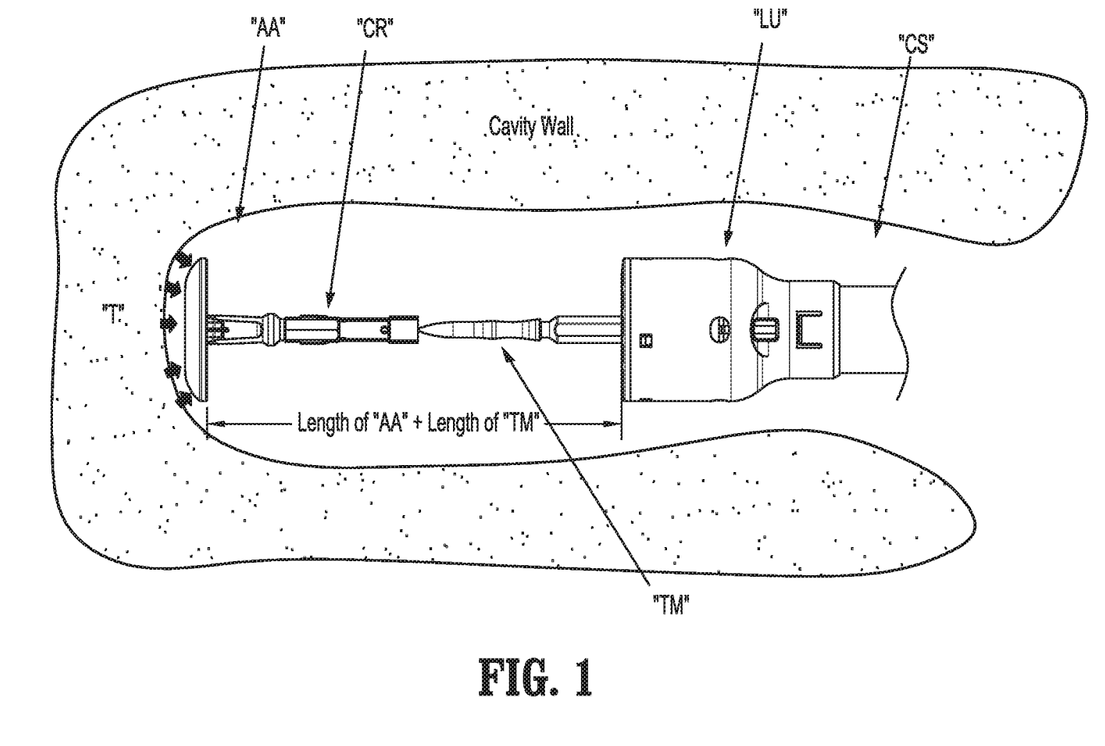
FIG. 1 is a schematic side view of an anvil assembly of a traditional circular stapling instrument being attached to a trocar member of the circular stapling instrument.

FIG. 1 illustrates tension "T" that is created when aligning a center rod "CR" of an anvil assembly "AA" with a trocar member "TM" extending from a loading unit "LU" of a circular stapling instrument "CS". To attach the anvil assembly "AA" to the center rod "CR", the anvil assembly "AA" is placed end to end with the trocar member "TM", requiring a space within the abdominal cavity at least as long as the combined length of the trocar member "TM" and the anvil assembly "AA".

To better facilitate attachment of an anvil assembly to a trocar member of the circular stapling instrument, it would be beneficial to have a trocar member having a length that may be shortened prior to the anvil assembly being attached to the trocar member.

SUMMARY

A trocar member for a circular stapling instrument includes a tubular housing and a tip member moveable relative to the tubular housing between an extended position and a retracted position. The tubular housing includes proximal and distal portions and defines a longitudinal passage. The tubular housing includes a flange configured for operable engagement with an anvil assembly. The tip member is disposed entirely within the tubular housing when in the retracted position.

In certain aspects of the disclosure, the trocar member further includes a spring member for biasing the tip member to the retracted position. The trocar member may include a latch mechanism for maintaining the tip member in the extended position. The latch mechanism may include a latch member. The latch member may be movable between a locked position and an unlocked position. The latch member may be configured to engage the tip member when in the locked position to maintain the tip member in the extended position. The latch member may be spaced from the tip member when in the unlocked position to permit movement of the tip member from the extended position to the retracted position. The tip member may include a cylindrical body and an extension extending from the cylindrical body. The spring member may be a tension spring. The flange may be configured for operable engagement with a center rod assembly of the anvil assembly. The tip member may include a tissue piercing tip.

A trocar member for a circular stapling instrument includes a tubular housing having proximal and distal portions, and a tip member moveable within the longitudinal passage of the tubular housing between an extended position and a retracted position. The tubular housing defines a longitudinal passage. The tubular housing includes a flange configured for operable engagement with an anvil assembly. The trocar member includes a first length when the tip member is in the extended position and a second, shorter length when the tip member is in the retracted position.

In aspects of the disclosure, the trocar member further includes a spring member for biasing the tip member to the retracted position. The trocar member may include a latch mechanism for maintain the tip member in the extended position. The latch mechanism may include a latch member. The latch member may be movable between a locked position and an unlocked position. The latch member may be configured to engage the tip member when in the locked position to maintain the tip member in the extended position. The latch member may be spaced from the tip member when in the unlocked position to permit movement of the tip member from the extended position to the retracted position. The tip member may include a cylindrical body and an extension extending from the cylindrical body. The spring member may be a tension spring. The flange may be configured for operable engagement with a center rod assembly of the anvil assembly. The tip member may include a tissue piercing tip.

A circular stapling device includes an elongate body having proximal and distal portions, a loading unit supported on the distal portion of the elongate body, a trocar member extending through the loading unit. The trocar member includes a tubular housing and a tip member moveable relative to the tubular housing between an extended position and a retracted position. The tubular housing includes a flange configured for releasable connection with an anvil assembly.

BRIEF DESCRIPTION OF THE DRAWINGS

The accompanying drawings, which are incorporated in and constitute a part of this specification, illustrate aspects of the disclosure and, together with a general description of the disclosure given above, and the detailed description given below, explain the principles of the disclosure, wherein.

DETAILED DESCRIPTION

Aspects of the disclosure are described in detail with reference to the drawings, in which like reference numerals designate identical or corresponding elements in each of the several views. As used herein, the term "distal" refers to that portion of the adapter assembly or surgical device, or component thereof, farther from the user during use of the instrument in its customary fashion, while the term "proximal" refers to that portion of the adapter assembly or surgical device, or component thereof, closer to the user during use of the instrument in its customary fashion. As used herein, the term clinician refers to anyone involved in a surgical procedure, including but not limited to, surgeons, support staff, and other medical personnel. As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

Figure 2:
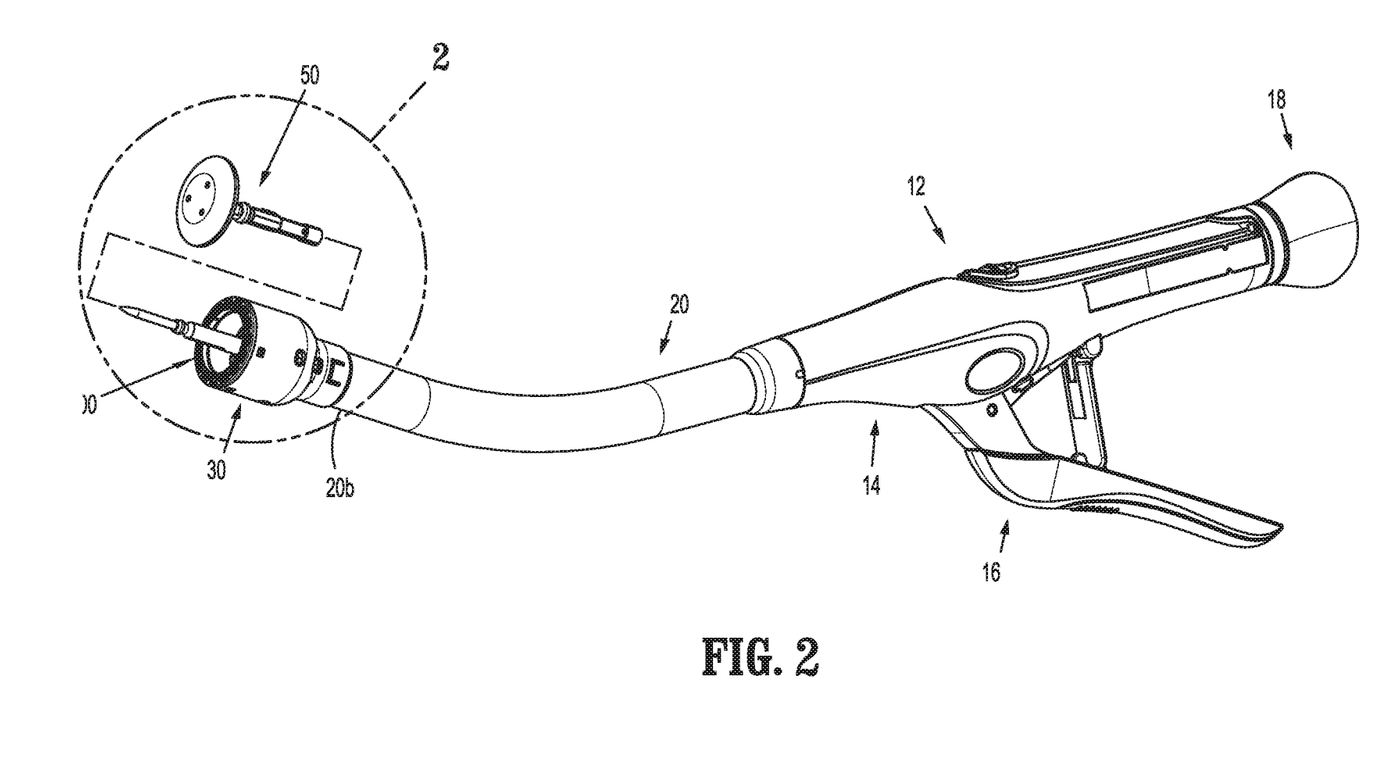
FIG. 2 is a side view of a circular stapling instrument according to aspects of the disclosure.

FIG. 2 illustrates a circular stapling instrument according to aspects of the disclosure, shown generally as circular stapler 10. The circular stapler 10 includes a manually actuated handle assembly 12 including a housing 14, a trigger assembly 16, and an approximation knob 18. An elongate body 20 extends from the handle assembly 12 and includes a loading unit 30 disposed on a distal end 20b of the elongate body 20. Although shown as being integrally formed with the handle assembly 12, it is envisioned that the elongate body 20 may form a separate and/or removable component. Similarly, the loading unit 30 may be integrally formed with the elongate body 20 or configured as a replaceable unit.

A trocar assembly 100 extends from the elongate body 20 of the circular stapler 10 through the loading unit 30. The trocar assembly 100 is movable between advanced and retracted positions. In the advanced position, the trocar assembly 100 is configured to facilitate securing a section of tubular organ about the loading unit 30 and facilitate attaching the anvil assembly 50 to the elongate body 20. When an anvil assembly 50 is coupled to the trocar assembly 100, movement of the trocar assembly 100 to the retracted position causes the anvil assembly 50 to move towards the loading unit 30, thereby compressing tissue between the anvil assembly 50 and the loading unit 30 prior to stapling and cutting of the tissue. As will be described in further detail below, the trocar assembly 100 is adapted to be releasably coupled to the anvil assembly 50.

The circular stapler 10 will only be described to the extent necessary to fully disclose aspects of the disclosure. For a detailed description of exemplary circular staplers with manually actuated handle assemblies, please refer to U.S. Pat. Nos. 7,364,060, and 7,303,106, the contents of which are incorporated herein by reference herein their entirety.

Although aspects of the trocar assembly 100 will be described in detail with respect to the manually actuated handle assembly 12, it is envisioned that aspects of the disclosure may be modified for use with powered and non-powered handle assemblies having similar and various other configurations, and for use with robotic systems. For a detailed description of exemplary electromechanical powered handle assemblies, please refer to U.S. Pat. Nos. 9,055,943 and 9,918,713, the contents of which are incorporated by reference herein in their entirety.

Figure 3:
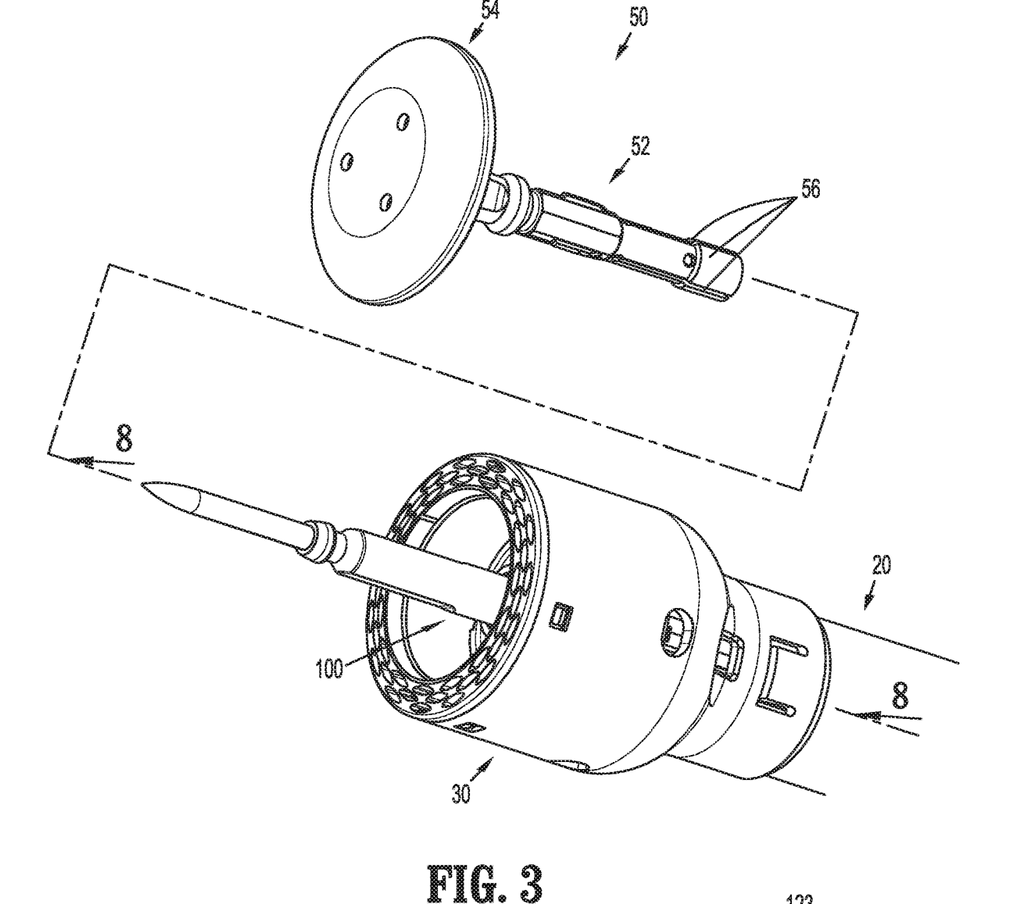
FIG. 3 is an enlarged view of the indicated area of detail shown in FIG. 2.
Figures 15, 16:
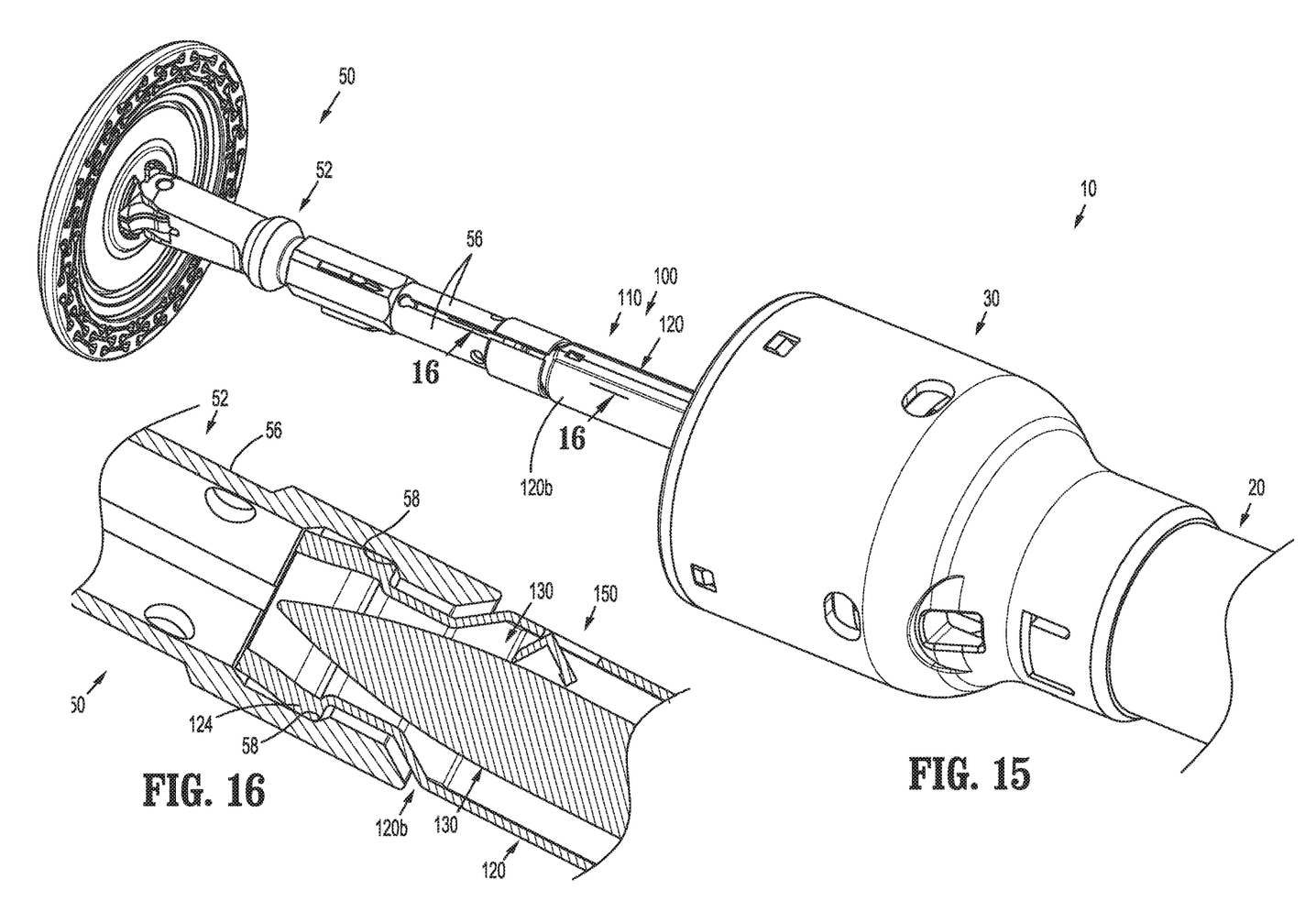
FIG. 15 is the perspective side view of the distal end of the circular stapling instrument shown in FIG. 13, with the anvil assembly attached to the trocar member.
FIG. 16 is a cross-sectional side view taken along section line 16-16 shown in FIG. 15.

FIG. 3 illustrates the distal or operational end of the circular stapler 10 including the loading unit 30, a trocar member 110 of the trocar assembly 100 extending through and from the loading unit 30, and the anvil assembly 50 detached from the trocar assembly 100. The anvil assembly 50 includes a center rod assembly 52 and a head assembly 54 pivotally secured to the center rod assembly 52. A free end of the center rod assembly 52 includes a plurality of legs 56 each having a shoulder 58 (FIG. 15). The anvil assembly 50 will only be described to the extent necessary to fully disclose the aspects of the disclosure. For a detailed description of an exemplary anvil assembly, please refer to U.S. Pat. No. 8,328,063, the content of which is incorporated by reference herein in its entirety.

Figure 4:
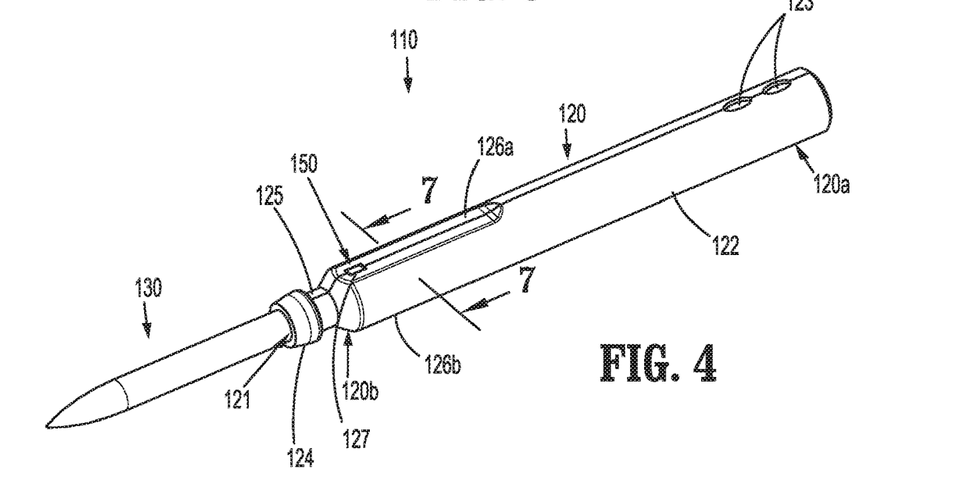
FIG. 4 is a perspective side view of a trocar member of the circular stapling instrument shown in FIG. 2.
Figure 5:
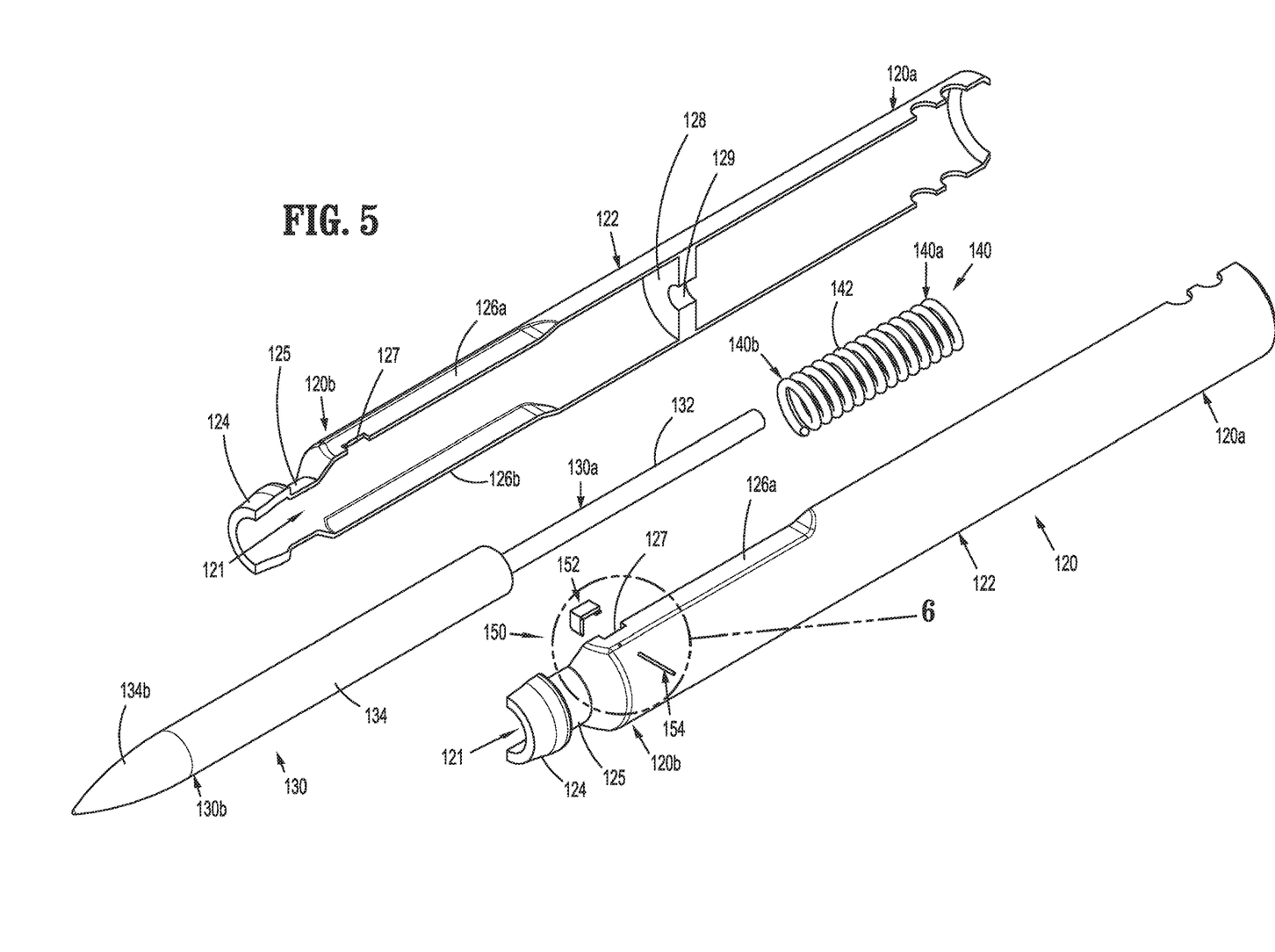
FIG. 5 is a perspective side view of the trocar member shown in FIG. 4, with parts separated.

FIGS. 4 and 5 illustrate the trocar member 110 of the trocar assembly 100 including a housing 120 and a tip member 130 extendable from the housing 120. As will be described in further detail below, the tip member 130 is retained against the bias of a spring member 140 (FIG. 5) by a latch mechanism 150.

The housing 120 of the trocar member 110 defines a substantially tubular body 122 having proximal and distal portions 120a, 120b and defining a longitudinal passage 121. The proximal portion 120a of the housing 120 is configured to engage a retractable connector member 60 (FIG. 9) that is operably connected with the approximation knob 18 (FIG. 2) of the handle assembly 12 of the circular stapler 10 to permit retraction of the trocar member 110 relative to the loading unit 30. As shown, the proximal end 120a of the tubular body 122 includes a pair of openings 123 each configured to receive a locking pin 62 (FIG. 9) or other locking mechanism for securing the trocar member 110 to the connector member 60.

A flange 124 is formed on the distal portion 120b of the housing 120 of the trocar member 110 and defines a groove 125. The flange 124 and groove 125 are configured to facilitate connection with the anvil assembly 50. More particularly, the shoulder 58 on each of the plurality of legs 56 of the center rod assembly 52 of the anvil assembly 50 engage the flange 124 of the trocar member 110 to secure the anvil assembly 50 relative to the trocar member 110. As is known in the art, retraction of the trocar assembly 100 within the loading unit 30 secures the plurality of legs 56 of the center rod assembly 52 of the anvil assembly 50 relative to the trocar member 110, thereby locking the anvil assembly 50 to the trocar member 110. The distal portion 120b of the housing 120 further includes opposed first and second flattened surfaces 126a, 126b. A cutout 127 is located along the first flattened surface 126a. A shelf 128 (FIG. 5) is positioned between the proximal and distal portions 120a, 120b of the housing 120 of the trocar member 110 and defines an opening 129.

The tip member 130 of the trocar member 110 includes a proximal portion 130a (FIG. 5) and a distal portion 130b. The proximal portion 130a of the tip member 130 includes a cylindrical extension 132 sized to be received through the opening 129 in the shelf 128 of the housing 120. The distal portion 130b of the tip member 130 includes a cylindrical body 134 having a tapered, tissue piercing free end 134b. As will be described in detail below, the tip member 130 is configured to be retracted within the housing 120 of the trocar assembly 100.

The trocar assembly 100 includes a spring member 140 in the form of a tension spring 142 for retracting the tip member 130 of the trocar member 110 within the housing 120 of the trocar member 110. Although shown as a tension spring 142, it is envisioned that the spring member 140 may include elastic bands, pistons, or other mechanisms suitable for retracting the tip member 130 within the housing 120. The spring member 140 is configured to be received about the cylindrical extension 132 of the tip member 130 and includes proximal and distal end portions 140a, 140b. The proximal end portion 140a of the spring member 140 is configured to be secured relative to the shelf 128 in the housing 120 and the distal end portion 140b of the spring member 140 is configured to be secured relative to the cylindrical body 134 of the tip member 130. In this manner, movement of the tip member 130 away from the shelf 128 causes the spring member 140 to stretch, thereby creating a biasing force against the spring member 140.

Figure 6:
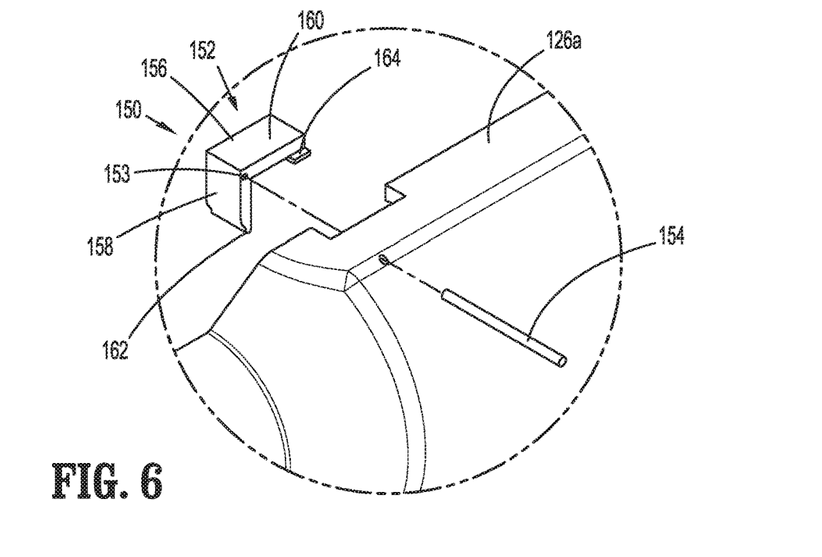
FIG. 6 is an enlarged view of the indicated area of detail shown in FIG. 5.
Figures 8, 9:
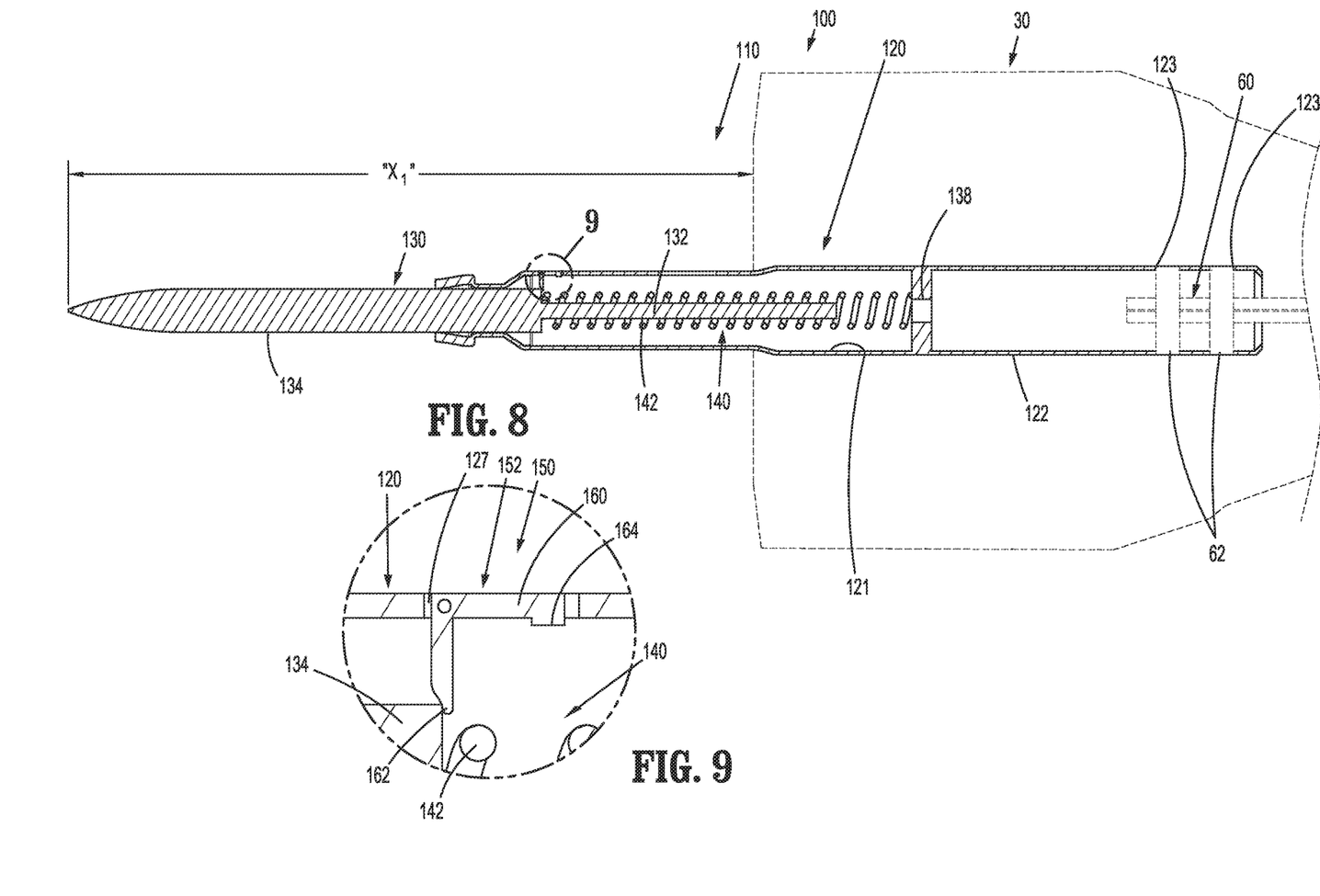
FIG. 8 is a cross-sectional side view taken along section line 8-8 shown in FIG. 3.
FIG. 9 is an enlarged view of the indicated area of detail shown in FIG. 8.

FIG. 6 illustrates the latch mechanism 150 of the trocar assembly 100 including a latch member 152 and a pin 154 for pivotally securing the latch member 152 within the cutout 127 (FIG. 5) in the first flattened surface 126a of the housing 120 of the trocar member 110. The latch member 152 includes a substantially L-shaped body 156 having a first leg 158 and a second leg 160. An engaging portion 162 is formed on the first leg 158 and a pair of tabs 164 extend outwardly from second leg 160. The engaging portion 162 on the first leg 158 is configured to engage the cylindrical body 134 of the tip member 130 when the latch mechanism 150 is in a locked position (FIG. 9). The pair of tabs 164 on the second leg 160 engage an underside of the first flattened surface 126a of the housing 120 of the trocar member 110 to retain the latch member 152 within the housing 120 of the trocar member 110. The latch member 152 defines an opening 153 between the first and second legs 158, 160 of the substantially L-shaped body 154 for receiving the pin 154.

Figure 7:
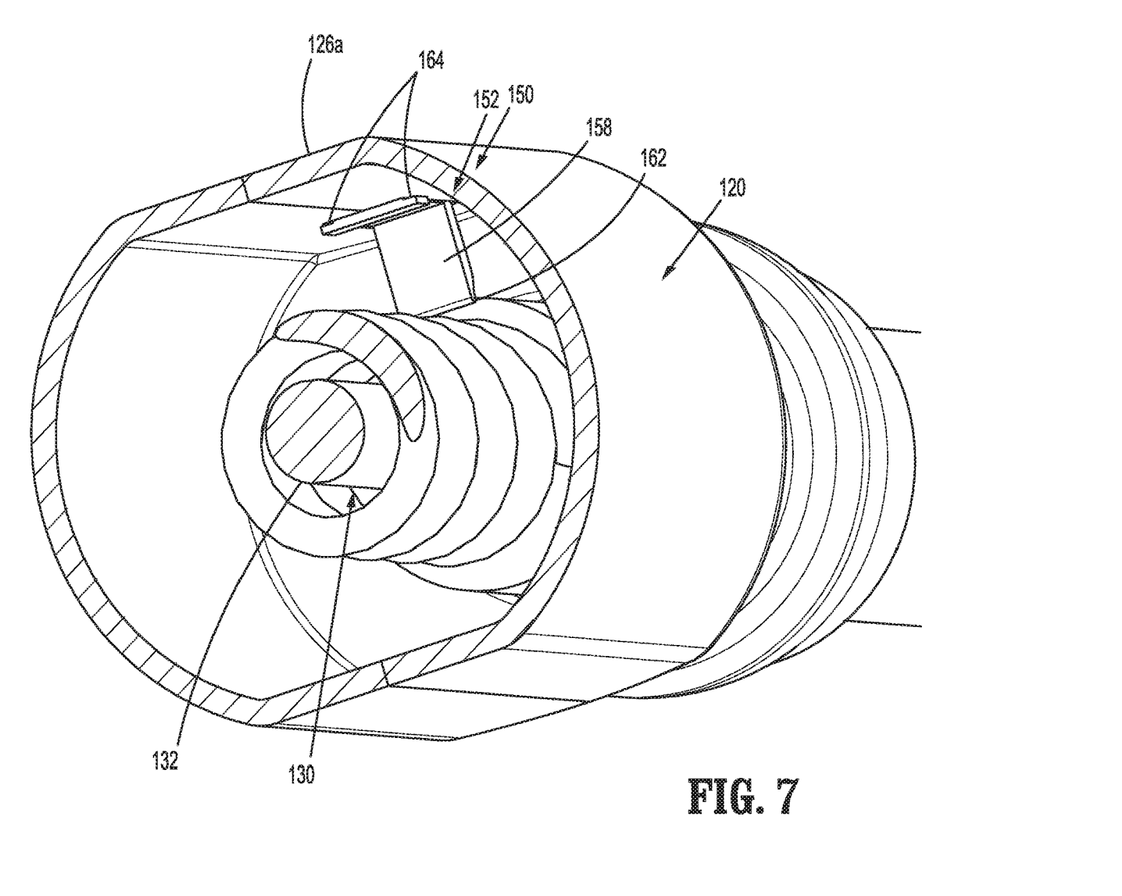
FIG. 7 is a cross-sectional end view taken along section line 7-7 shown in FIG. 4.

FIGS. 7-9 illustrate the trocar member 110 of the trocar assembly 100 with the tip member 130 in the extended position and the latch mechanism 150 in the locked position. When the tip member 130 of the trocar member 110 is in the extended position, the tension spring 140, with the proximal end portion 140a secured relative to the shelf 126 in the housing 120 and the distal end portion 140b secured relative to the cylindrical body 134 of the tip member 130, is stretched to create a biasing force against the tip member 130. Engagement of the engaging portion 162 of the latch member 152 of the latch mechanism 150 with the cylindrical body 134 of the tip member 130 of the trocar member 110 locks the tip member 130 in the extended position. When the tip member 130 of the trocar member 110 is in the extended position, the trocar member 110 operates as a traditional trocar member, facilitating the positioning of a second section "S2" (FIG. 10) of a tubular organ "O" receiving the anastomosis about the loading unit 30.

After the second section "S2" of the tubular organ "O" receiving the anastomosis is positioned about the loading unit 30 and prior to the tip member 130 of the trocar member 110 moving to the retracted position, the distance between loading unit 30 and a distalmost end of the trocar member 110 defines a first distance "x1" (FIG. 8). As described previously, attaching the anvil assembly 50 (FIG. 3) to a traditional trocar member "TM" (FIG. 1) requires a space equal to at least the first distance "x1" plus the length of the anvil assembly 50, a distance "y" (FIG. 10).

Figure 10:
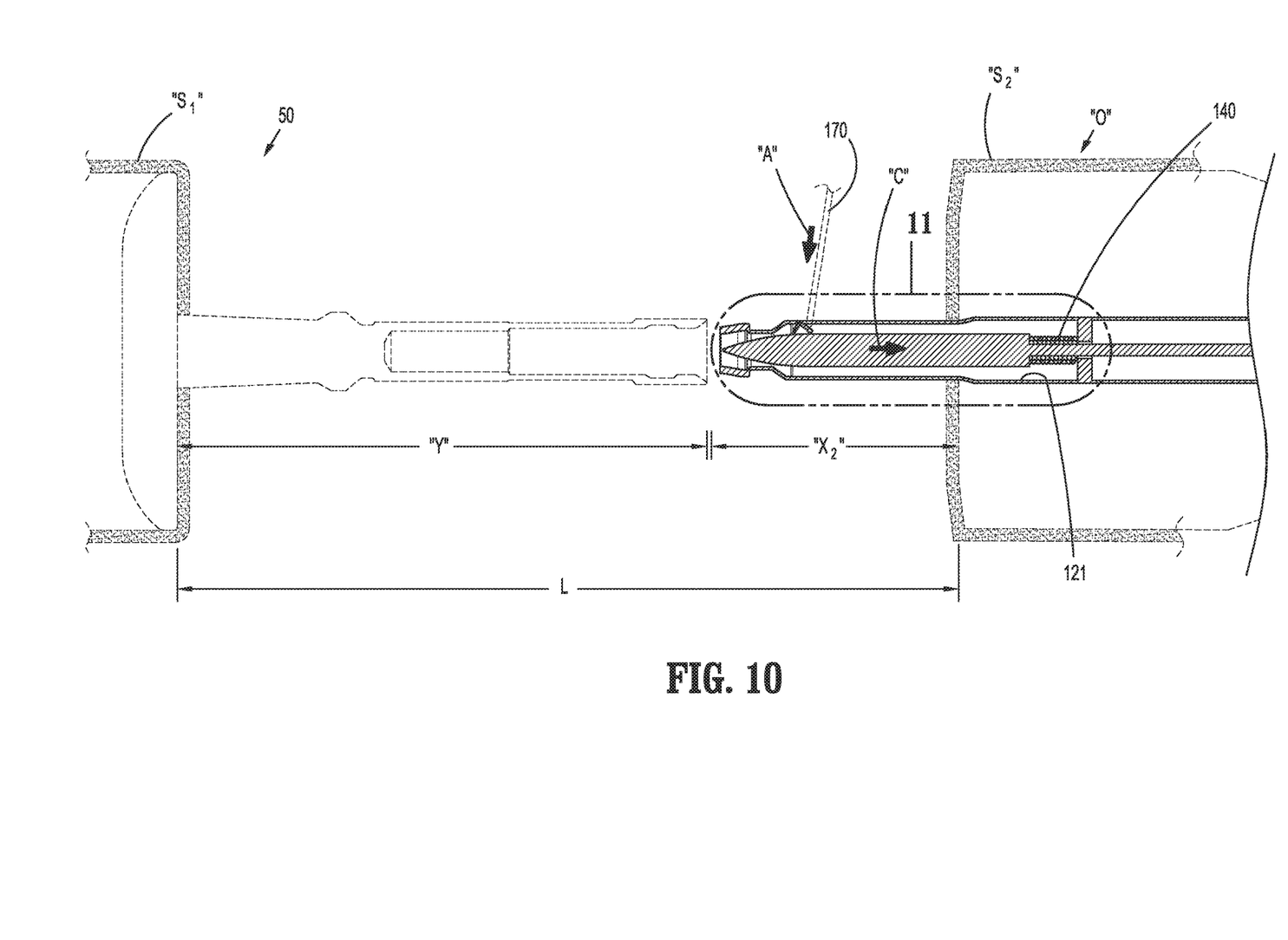
FIG. 10 is the cross-sectional side view shown in FIG. 8 with a tip member of the trocar member in a retracted position.
Figures 11, 12:
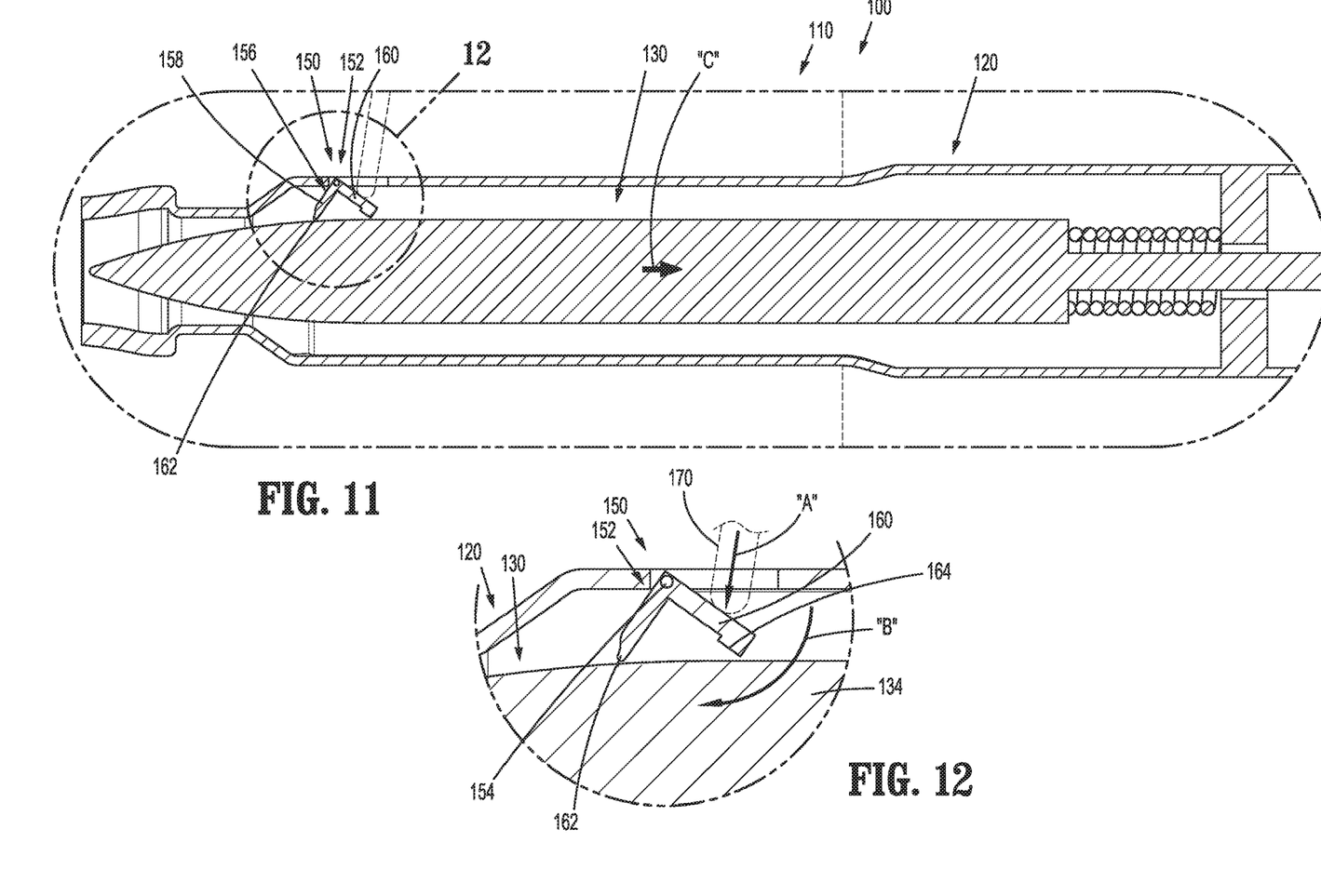
FIG. 11 is an enlarged view of the indicated area of detail shown in FIG. 10.
FIG. 12 is an enlarged view of the indicated area of detail shown in FIG. 11.

FIGS. 10-12 illustrate the trocar member 110 of the trocar assembly 100 subsequent to the second section "S2" of the tubular organ being positioned about the loading unit 30 and prior to attaching the anvil assembly 50 to the trocar member 110. As noted previously, the tissue piercing free end 134b of the distal portion 130b of the tip member 130 is configured to facilitate positioning of the second section "S2" of the tubular organ about the loading unit 30. Once the second section "S2" is positioned about the loading unit 30, the tip member 130 of the trocar member 110 is no longer necessary and may be retracted. Retraction of the tip member 130 requires pressing on the second leg 160 of the latch member 152 of the latch mechanism 150, as indicated by arrow "A" in FIG. 10, to cause the latch member 152 to pivot about pivot pin 154, as indicated by arrow "B" in FIG. 12, to move the latch member 152 from a locked position to an unlocked position. As the latch member 152 of the latch mechanism 150 pivots to the unlocked position, the engaging portion 160 of the latch member 152 disengages from the cylindrical body 134 of the tip member 130, allowing the tension spring 142 to retract the tip member 130 within the housing 120 of the trocar assembly 100, as indicated by arrow "C" in FIG. 11.

Although the latch member 152 of the latch mechanism 150 is shown as being pressed directly by a device 170, it is envisioned that that the latch mechanism 150 may have a release button or actuation mechanism that may be depressed directly by the clinician. It is further envisioned that the anvil assembly 50 may be modified to include a mechanism for effecting unlocking of the latch mechanism 150. It also envisioned that a release mechanism may be disposed in the handle assembly 12 (FIG. 2) to permit remote release of the latch mechanism 150. In this manner, a wire or other suitable means may extend through the elongate body 20 (FIG. 2) of the circular stapler 10 and include a release button in the handle assembly 12 that may be triggered by the clinician to cause the unlocking of the latch mechanism 150 and the subsequent retraction of the tip member 130.

Figure 13:
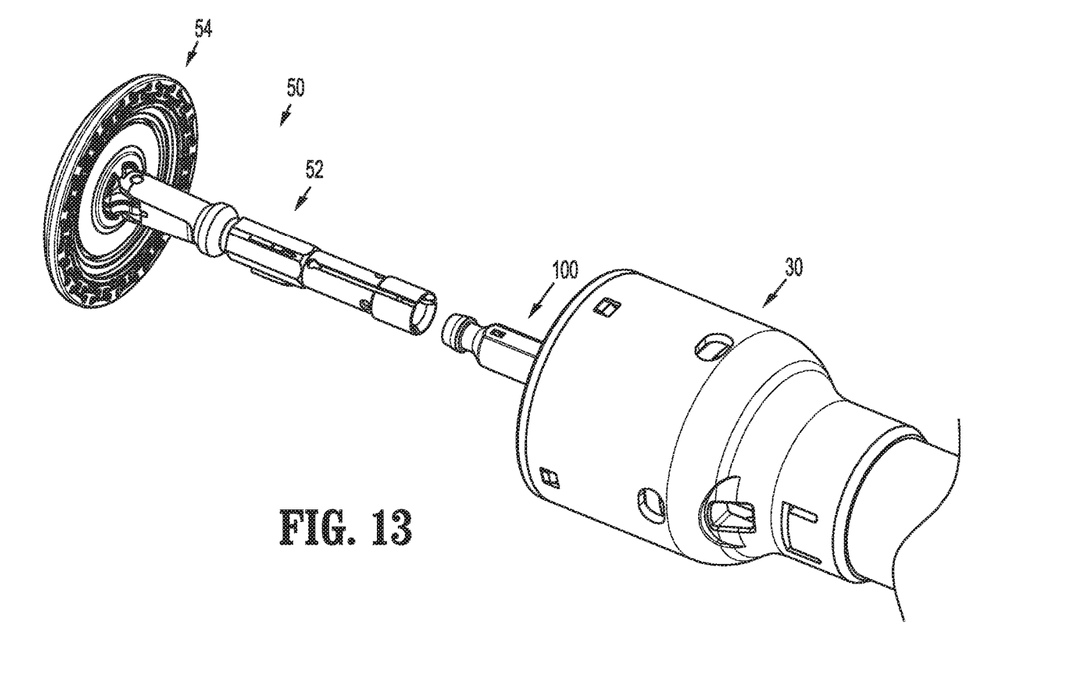
FIG. 13 is a perspective side view of a distal end of the circular stapling instrument shown in FIG. 2, with a tip member of the trocar member in a retracted position and an anvil assembly spaced from the trocar member.
Figure 14:
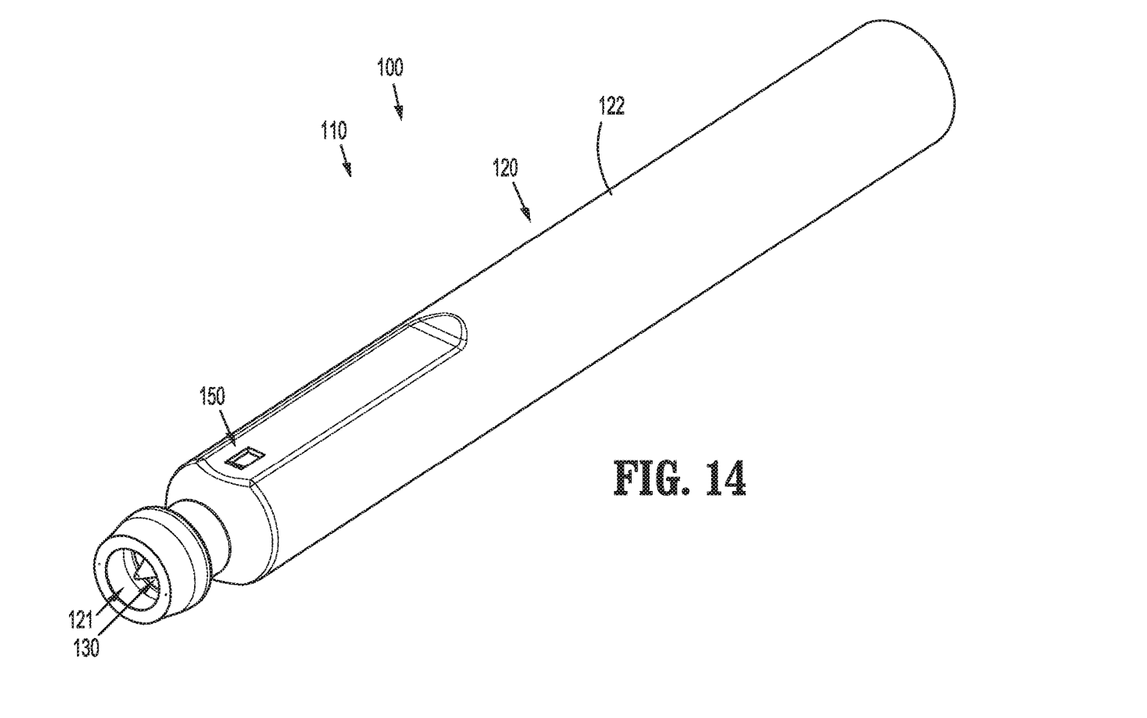
FIG. 14 is a perspective top view of the trocar member shown in FIG. 13, with the tip member in a retracted position.

FIGS. 13 and 14 illustrate the trocar member 110 with the tip member 130 in the retracted position, disposed entirely within the longitudinal passage 121 of the housing 120. The tip member 130 is maintained in the retracted position by the bias of the tension spring 140 (FIG. 10). It is envisioned that the latch mechanism 150 may be configured such that the latch member 152 retains the tip member 130 of the trocar member 110 in the retracted position.

After the tip member 130 of the trocar member 130 is retracted within the housing 120 of the trocar member 110, a distalmost end of the trocar member 110 defines a second distance "x2" (FIG. 10). The second distance "x2" is shorter than the first distance "x1". In this manner, the space required to align the center rod assembly 52 of the anvil assembly 50 with the trocar member 110 when the trocar member 110 is in the retracted position (FIG. 10) is less than the space required to align the center rod assembly 52 of the anvil assembly 50 with the trocar member 110 when the trocar member 110 is in the extended position (FIG. 8). In certain aspects of the disclosure, the combined length of the anvil assembly 50 and the first distance "x1" is ~91 mm and the combined length of the anvil assembly 50 and the second distance "x2" is ~67 mm, resulting in a decrease in combined length of about 26.4%. As noted previously, the shorter length required to align the center rod assembly 52 of the anvil assembly 50 with the trocar member 110 of the circular stapler 10 will reduce the space necessary to complete the procedure and reduce the likelihood of damage to the tissue being stapled and the surrounding tissue.

FIGS. 15 and 16 illustrate the anvil assembly 50 attached to the trocar member 110 of the trocar assembly 100. In this configuration, the shoulder 58 of each the plurality of legs 56 of the center rod assembly 52 of the anvil assembly 50 engage the flange 124 of on the distal portion 120b of the housing 120 of the trocar member 110 to secure the anvil assembly 50 relative to the trocar member 110. As noted previously, retraction of the trocar assembly 100 into the elongate body 30 of the circular stapler 10 locks the center rod assembly 52 of the anvil assembly 50 to the trocar member 110.

Once the anvil assembly 50 is secured to the trocar assembly 100, the circular stapler 10 operates in as is known in the art and the anastomosis procedure is completed in a traditional manner. It is envisioned that the trocar member 110 may be configured for sterilization and reuse.

Persons skilled in the art will understand that the devices and methods specifically described herein and illustrated in the accompanying drawings are non-limiting exemplary aspects of the disclosure. It is envisioned that the elements and features illustrated or described in connection with one exemplary aspect may be combined with the elements and features of another without departing from the scope of the disclosure. As well, one skilled in the art will appreciate further features and advantages of the disclosure based on the above-described aspects. Accordingly, the disclosure is not to be limited by what has been particularly shown and described, except as indicated by the appended claims.

What is claimed is:

1. A trocar member for a circular stapling instrument, the trocar member comprising:
    a tubular housing having proximal and distal portions and defining a longitudinal passage, the tubular housing including a flange configured for operable engagement with an anvil assembly; and
    a tip member moveable relative to the tubular housing between an extended position and a retracted position, wherein the tip member is disposed entirely within the tubular housing when in the retracted position.

2. The trocar member of claim 1, including a spring member for biasing the tip member to the retracted position.

3. The trocar member of claim 2, including a latch mechanism for maintaining the tip member in the extended position.

4. The trocar member of claim 3, wherein the latch mechanism includes a latch member.

5. The trocar member of claim 4, wherein the latch member is movable between a locked position and an unlocked position.

6. The trocar member of claim 5, wherein the latch member is configured to engage the tip member when in the locked position to maintain the tip member in the extended position.

7. The trocar member of claim 6, wherein the latch member is spaced from the tip member when in the unlocked position to permit movement of the tip member from the extended position to the retracted position.

8. The trocar member of claim 2, wherein the spring member is a tension spring.

9. The trocar member of claim 1, wherein the tip member includes a cylindrical body and an extension extending from the cylindrical body.

10. The trocar member of claim 1, wherein the flange is configured for operable engagement with a center rod assembly of the anvil assembly.

11. The trocar member of claim 1, wherein the tip member includes a tissue piercing tip.

12. A trocar member for a circular stapling instrument, the trocar member comprising:
    a tubular housing having proximal and distal portions and defining a longitudinal passage, the tubular housing including a flange configured for operable engagement with an anvil assembly; and
    a tip member moveable within the longitudinal passage of the tubular housing between an extended position and a retracted position, wherein the trocar member includes a first length when the tip member is in the extended position and a second, shorter length when the tip member is in the retracted position.

13. The trocar member of claim 12, including a spring member for biasing the tip member to the retracted position.

14. The trocar member of claim 13, including a latch mechanism for maintain the tip member in the extended position.

15. The trocar member of claim 14, wherein the latch mechanism includes a latch member.

16. The trocar member of claim 15, wherein the latch member is movable between a locked position and an unlocked position.

17. The trocar member of claim 16, wherein the latch member is configured to engage the tip member when in the locked position to maintain the tip member in the extended position.

18. The trocar member of claim 17, wherein the latch member is spaced from the tip member when in the unlocked position to permit movement of the tip member from the extended position to the retracted position.

19. The trocar member of claim 12, wherein the distal portion of the tubular housing includes a flange configured for operable engagement with a center rod assembly of an anvil assembly.

20. A surgical stapling device comprising:
    an elongate body having proximal and distal portions;
    a loading unit supported on the distal portion of the elongate body; and
    a trocar member extending through the loading unit, the trocar member including a tubular housing and a tip member moveable relative to the tubular housing between an extended position and a retracted position, the tubular housing including a flange configured for releasable connection with an anvil assembly.

* * * * *